US009107216B2

(12) United States Patent
Nakasato

(10) Patent No.: US 9,107,216 B2
(45) Date of Patent: Aug. 11, 2015

(54) BASE STATION AND FREQUENCY BAND ALLOCATION METHOD

(75) Inventor: Yuuki Nakasato, Ogaki (JP)

(73) Assignee: KYOCERA Corporation, Kyoto (JP)

( * ) Notice: Subject to any disclaimer, the term of this patent is extended or adjusted under 35 U.S.C. 154(b) by 81 days.

(21) Appl. No.: 13/997,175

(22) PCT Filed: Dec. 12, 2011

(86) PCT No.: PCT/JP2011/078642
§ 371 (c)(1),
(2), (4) Date: Jun. 21, 2013

(87) PCT Pub. No.: WO2012/086439
PCT Pub. Date: Jun. 28, 2012

(65) Prior Publication Data
US 2013/0273927 A1    Oct. 17, 2013

(30) Foreign Application Priority Data
Dec. 22, 2010    (JP) .................................. 2010-285621

(51) Int. Cl.
*H04W 72/04*    (2009.01)
*H01Q 3/26*    (2006.01)
(Continued)

(52) U.S. Cl.
CPC ......... *H04W 72/0453* (2013.01); *H01Q 3/2605* (2013.01); *H04B 7/0617* (2013.01); *H04B 7/0619* (2013.01); *H04W 16/28* (2013.01); *H04W 28/06* (2013.01)

(58) Field of Classification Search
CPC .... H04B 7/061; H04B 7/0691; H04B 7/0874; H04B 7/0608; H04B 1/38; H04B 1/713; H04B 7/0673; H04B 7/0695; H04B 7/0817; H04B 7/2634; H04L 5/0023; H04L 25/0228; H04L 25/0224; H04L 5/0007; H04W 16/02; H04W 16/12; H04W 52/42
See application file for complete search history.

(56) References Cited

U.S. PATENT DOCUMENTS 5,574,974 A     11/1996  Almgren et al.
2006/0098688 A1* 5/2006  Parkvall et al. ............... 370/477
(Continued)

FOREIGN PATENT DOCUMENTS

JP    11-502384 A    2/1999
JP    3620779 B2     11/2004
(Continued)

OTHER PUBLICATIONS

Motorola, "Uplink Sounding for Obtaining MIMO Channel Information at Node B in E-UTRA", 3GPP TSG RAN WG1 #44, R1-060668, 3GGP, Feb. 13, 2013.
(Continued)

*Primary Examiner* — Liton Miah
(74) *Attorney, Agent, or Firm* — Procopio, Cory, Hargreaves & Savitch LLP

(57) ABSTRACT

A communication unit includes a plurality of antennas and controls, in transmitting signal using the plurality of antennas, the transmission directivity of the plurality of antennas based on a known signal from the communication terminal. A radio resource allocation unit allocates, to the communication terminal, an uplink frequency band for use in transmission of the known signal from a plurality of unit frequency bands lined in a frequency direction. In newly allocating the uplink frequency band to the communication terminal, the radio resource allocation unit newly determines the uplink frequency band based on elapsed time since the last use of the unit frequency band as the uplink frequency band.

8 Claims, 16 Drawing Sheets

(51) Int. Cl.
*H04B 7/06* (2006.01)
*H04W 16/28* (2009.01)
*H04W 28/06* (2009.01)

(56) References Cited

U.S. PATENT DOCUMENTS

| | | | |
|---|---|---|---|
| 2008/0063097 A1* | 3/2008 | Horiuchi et al. | 375/260 |
| 2008/0285490 A1* | 11/2008 | Mukai et al. | 370/280 |
| 2009/0098838 A1* | 4/2009 | Guo et al. | 455/101 |
| 2009/0278742 A1 | 11/2009 | Mehta et al. | |
| 2009/0279447 A1 | 11/2009 | Mehta et al. | |
| 2010/0315962 A1 | 12/2010 | Imai et al. | |

FOREIGN PATENT DOCUMENTS

| | | |
|---|---|---|
| JP | 3620781 B2 | 11/2004 |
| WO | 2008/081857 A1 | 10/2008 |
| WO | 2009/136656 A1 | 11/2009 |

OTHER PUBLICATIONS

Texas Instruments, "On the Benefits of Multi-Shot Sounding", 3GPP TSG RAN WG1 #62bis, R1-105703, 3GPP, Oct. 11, 2010.
Huawei, HiSilicon, "Configuration of Aperiodic SRS", 3GPP TSG RAN WG1 meeting #63, R1-105849, Jacksonville, USA, Nov. 15-19, 2010.
Huawei, HiSilicon, Considerations for Dynamic Aperiodic SRS, 3GPP TSG RAN WG1 meeting #62, R1-104302, Madrid, Spain, Aug. 23-27, 2010.
Ericsson, St-Ericsson, "On the Details of Dynamic Aperiodic SRS", TSG-RAN WG1 #62, R1-104853, 3GPP, Aug. 23, 2010.
International Search Report dated Jan. 10, 2012, issued for International Application No. PCT/JP2011/078642.
International Preliminary Report on Patentability issued for International Application No. PCT/JP2011/078642.
Office Action dated Oct. 28, 2014, issued in counterpart Japanese Application 2010-285621.

* cited by examiner

F I G . 5
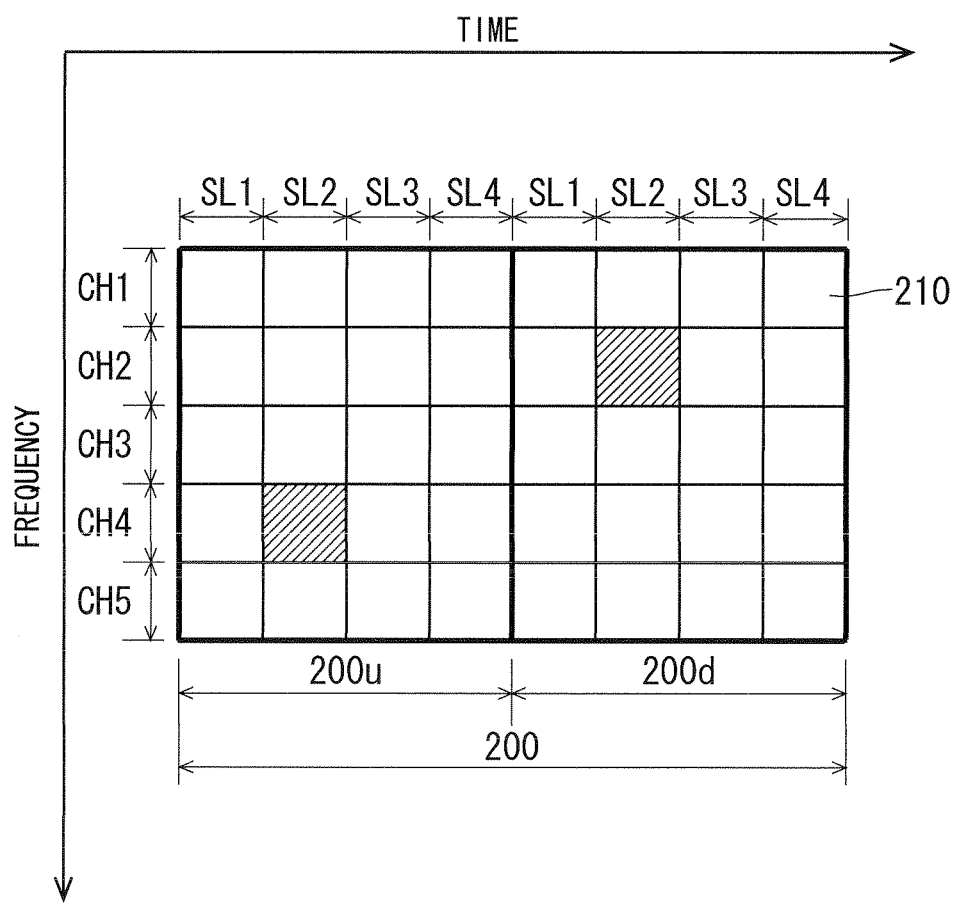

F I G . 7
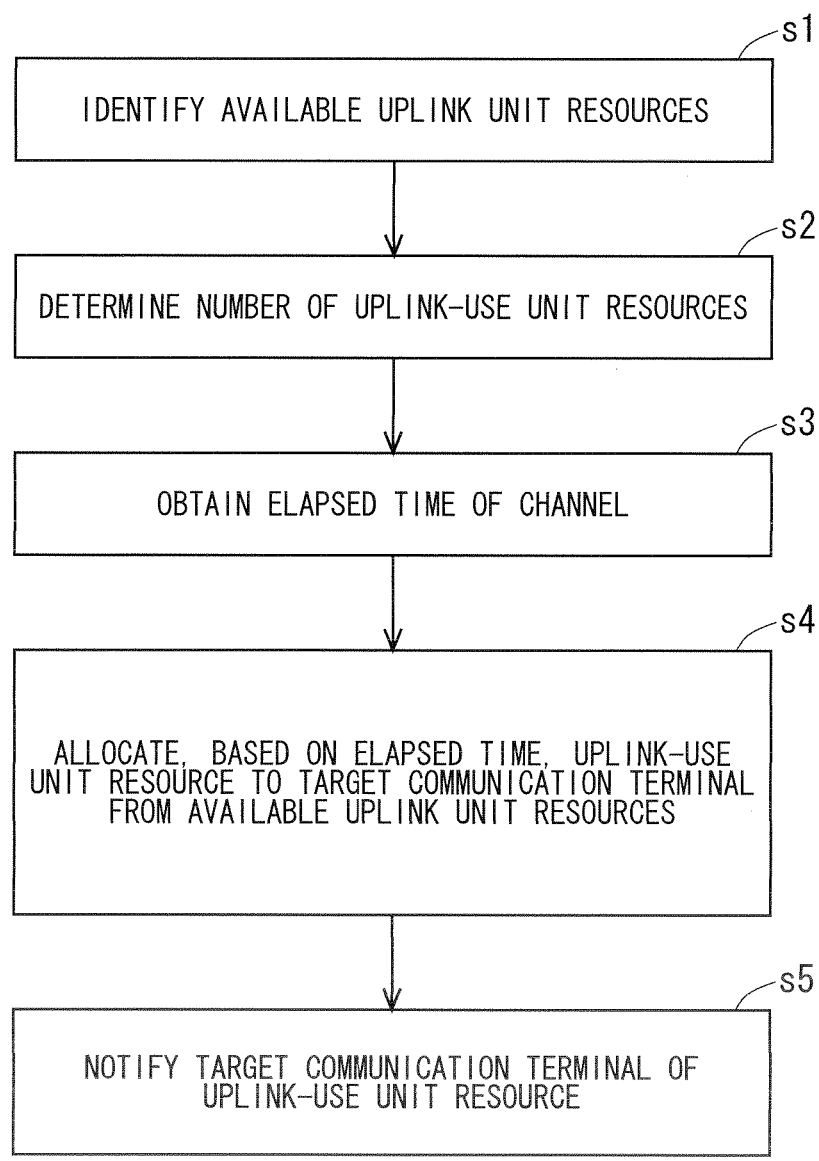

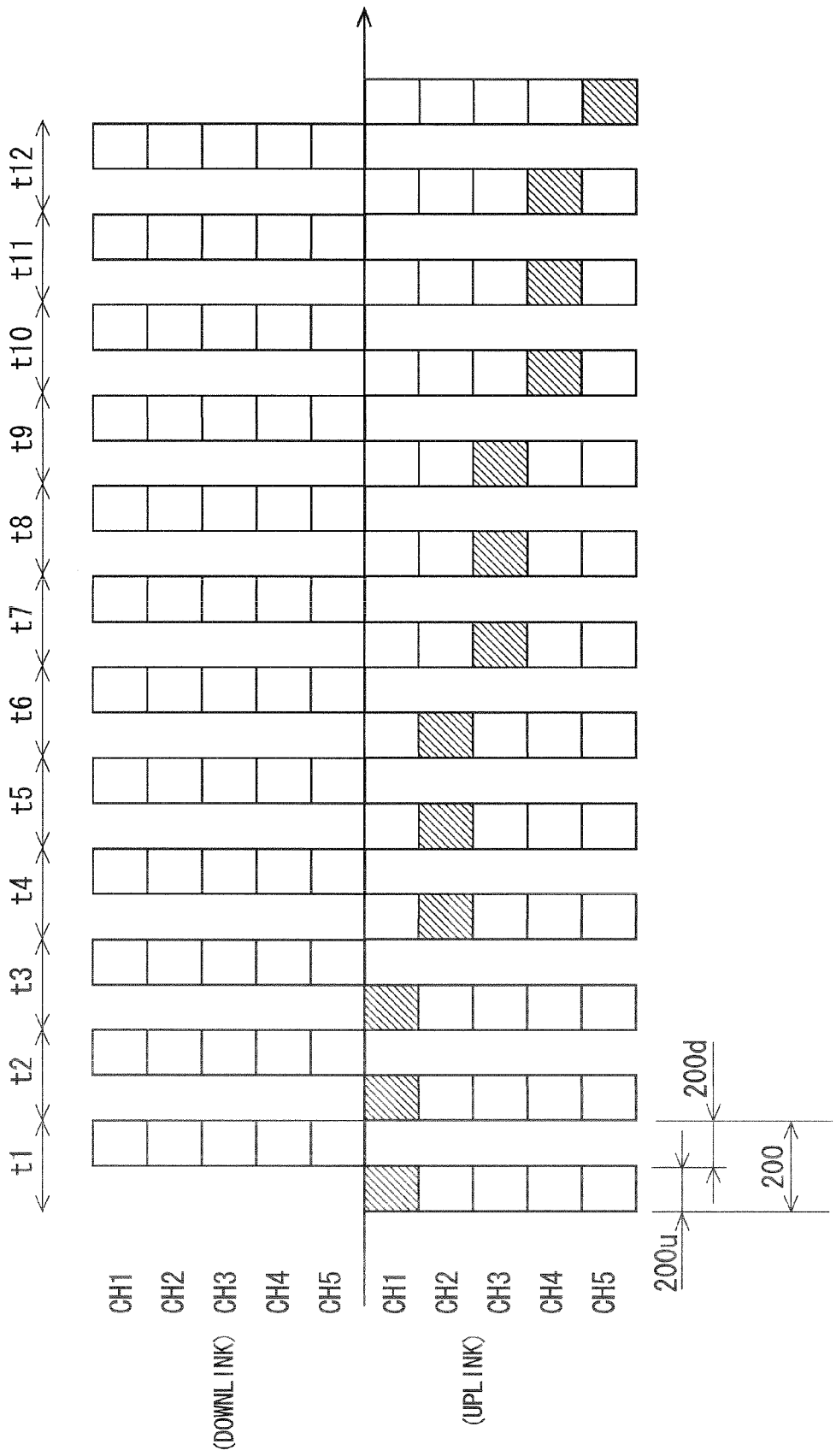

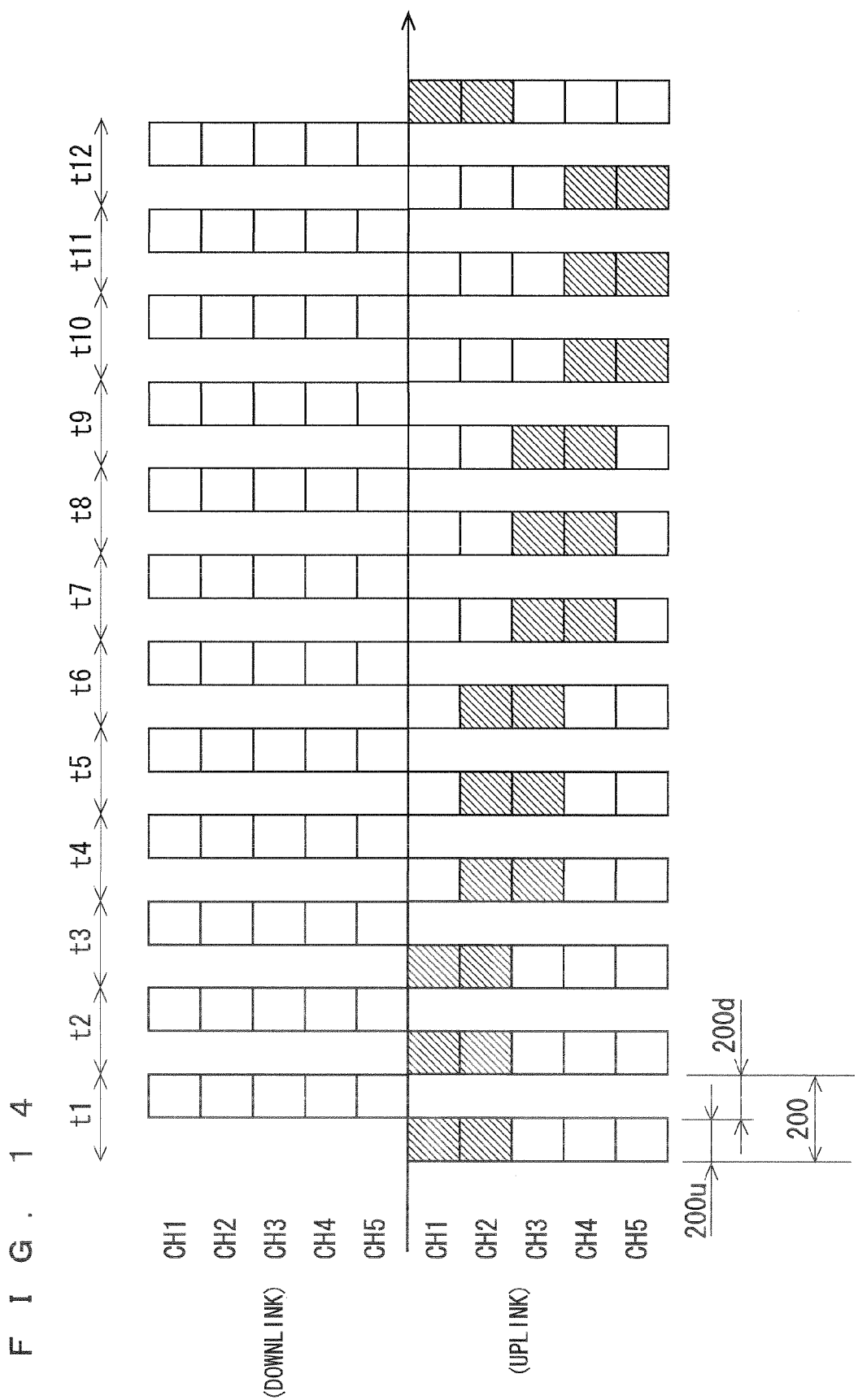

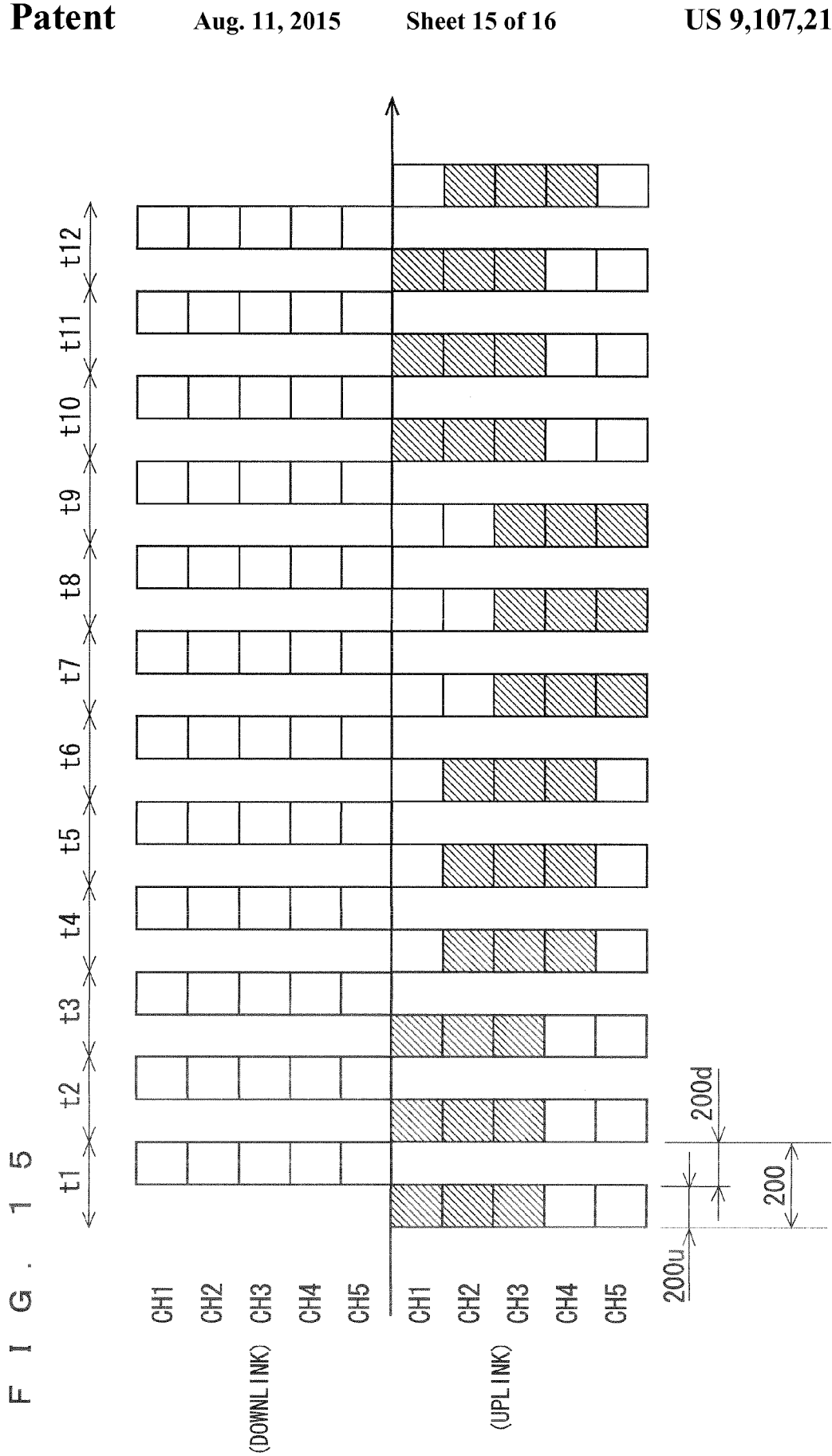

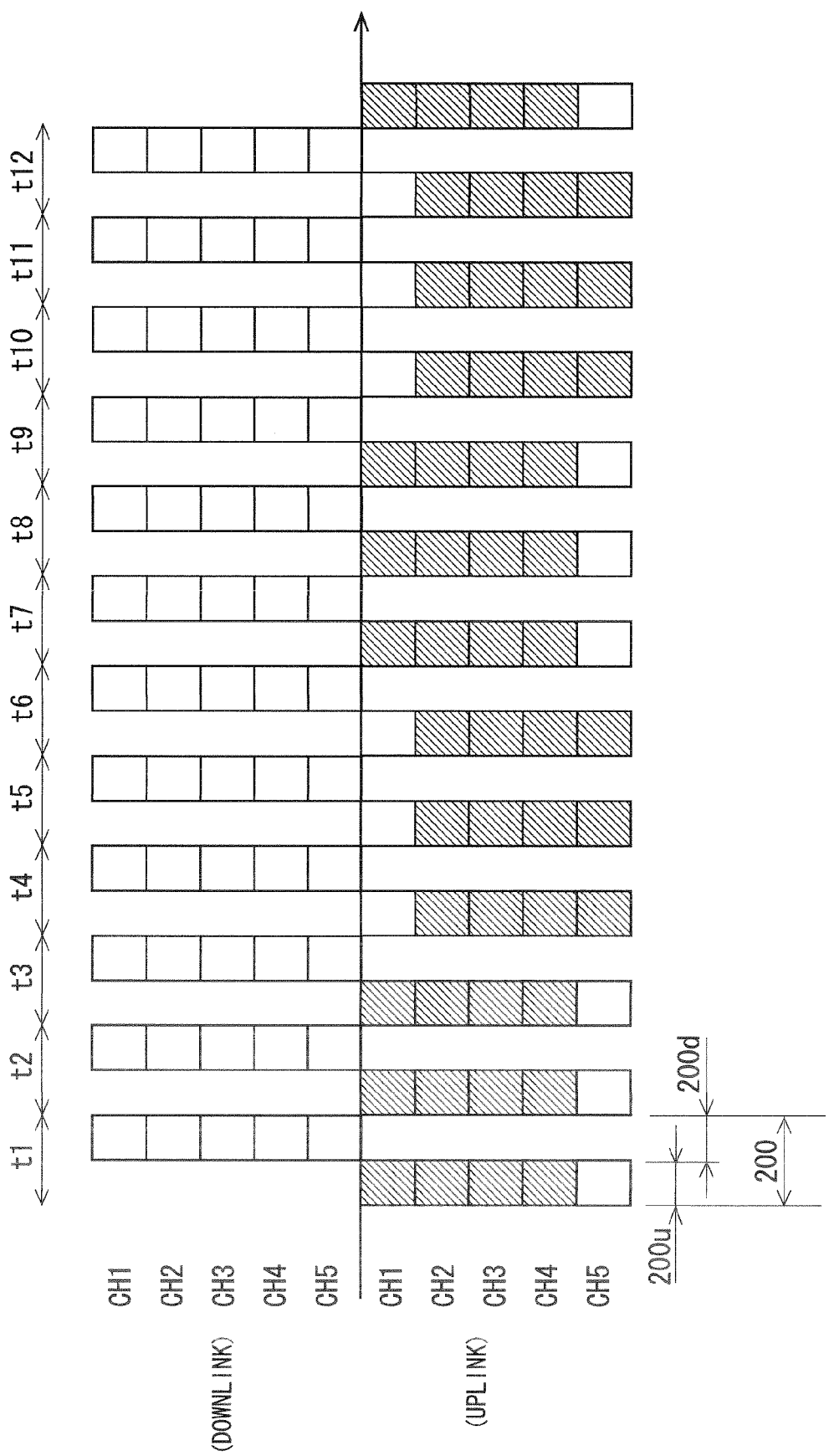

BASE STATION AND FREQUENCY BAND ALLOCATION METHOD

TECHNICAL FIELD

The present invention relates to a communication technique of performing communication by means of a plurality of antennas.

BACKGROUND ART

In a communication system in which a TDMA/TDD (Time Division Multiple Access/Time Division Duplexing) scheme is adopted, such as PHS (Personal Handyphon System) and XGP (eXtended Global Platform) also called next-generation PHS, a base station may adopt an adaptive array antenna scheme of adaptively controlling the directivity of an array antenna composed of a plurality of antennas. Patent Documents 1 and 2 disclose the technique regarding the adaptive array antenna scheme. The base station adopting the adaptive array antenna scheme controls the reception directivity and transmission directivity of the array antenna based on a known signal from a communication terminal.

PRIOR-ART DOCUMENTS

Patent Documents

Patent Document 1: Japanese Patent No. 3620779
Patent Document 2: Japanese Patent No. 3620781

SUMMARY OF THE INVENTION

Problem to be Solved by the Invention

In the PHS and XGP, as to the uplink radio resource and downlink radio resource for use in the same communication frame, the same frequency band is always allocated to the same communication terminal. Therefore, in a case where a base station that performs communication in the adaptive array antenna scheme transmits a transmission signal to a communication terminal in a communication frame, the transmission directivity of the array antenna can be controlled based on a known signal of the same frequency band as that of the transmission signal, which is transmitted from the communication terminal in the same communication frame.

As described above, in a case where the uplink radio resource and downlink radio resource are allocated to the same communication terminal in a symmetrical manner in one communication frame, the base station can control the transmission directivity of the array antenna based on a known signal received from a communication terminal at a timing close to the timing of transmitting a signal to the communication terminal. This enables to direct a beam related to the transmission directivity of the array antenna toward the communication terminal with high accuracy.

Meanwhile, in the LTE (Long Term Evolution) where the TDD scheme is adopted, uplink radio resources and downlink radio resources are independently allocated to communication terminals. It does not mean that as to the uplink radio resource and downlink radio resource for use in the same communication frame, the same frequency band is allocated to the same communication terminal. Therefore, in a case of transmitting a transmission signal to a communication terminal, the base station may fail to receive, from the communication terminal, a known signal transmitted in the same frequency band as that of the transmission signal. In this case, the transmission directivity of the array antenna cannot be controlled. Alternatively, in a case of transmitting a transmission signal to a communication terminal in a communication frame, the base station controls the transmission directivity of the array antenna based on a known signal transmitted in the same frequency band as that of the transmission signal, which has been received from the communication terminal in a communication frame preceding this communication frame.

As described above, in a case where the uplink radio resource and downlink radio resource are allocated to the same communication terminal in an asymmetrical manner in one communication frame, the base station is highly likely to transmit a signal without controlling the transmission directivity of the array antenna (perform omni-transmission) or control the transmission directivity of the array antenna based on a known signal received from a communication terminal at a timing distanced from the timing of transmitting a signal to the communication terminal. In a case of controlling the transmission directivity of an array antenna based on a known signal received from a communication terminal at a timing distanced from the timing of transmitting a signal to the communication terminal, the situation of the transmission path may change considerably between the reception of the known signal from the communication terminal and the transmission of a signal to the communication terminal. Then, a beam related to the transmission directivity of the array antenna cannot be directed toward the communication terminal with high accuracy. Therefore, the transmission performance of the base station cannot be secured sufficiently.

Therefore, the present invention has been made in view of the above, and an object thereof is to provide a technique capable of improving the transmission performance of a base station.

Means for Solving the Problem

A base station according to one aspect is a base station that communicates with a communication terminal using a plurality of antennas, which includes: a communication unit including a plurality of antennas, for controlling, in transmitting a signal using the plurality of antennas, the transmission directivity of the plurality of antennas based on a known signal from the communication terminal; and a radio resource allocation unit for allocating, to the communication terminal, an uplink frequency band for use in transmission of the known signal from a plurality of unit frequency bands lined in a frequency direction, wherein in newly allocating the uplink frequency band to the communication terminal, the radio resource allocation unit newly determines the uplink frequency band based on elapsed time since the last use of the unit frequency band as the uplink frequency band.

A base station according to one aspect is a base station that communicates with a communication terminal using a plurality of antennas, which includes: a communication unit including a plurality of antennas, for controlling, in transmitting a signal using the plurality of antennas, the transmission directivity of the plurality of antennas based on a known signal from the communication terminal; and a radio resource allocation unit for allocating, to the communication terminal, an uplink frequency band for use in transmission of the known signal from a plurality of unit frequency bands lined in a frequency direction, wherein the radio resource allocation unit allocates in order, to the communication terminal, parts of the plurality of unit frequency bands as the uplink frequency band.

A frequency band allocation method according to one aspect is a method of allocating a frequency band to a communication terminal by a base station that controls, in transmitting a signal to a communication terminal using a plurality of antennas, the transmission directivity of the plurality of antennas based on a known signal from the communication terminal, and the method includes: a first step of allocating, to a communication terminal, a downlink frequency band for use in transmission to the communication terminal; and a second step of allocating, to the communication terminal, an uplink frequency band for use in transmission of the known signal from a plurality of unit frequency bands lined in a frequency direction, wherein in the second step, in newly allocating the uplink frequency band to the communication terminal, the uplink frequency band is newly determined based on elapsed time since the last use of a unit frequency band as the uplink frequency band.

A frequency band allocation method according to one aspect is a method of allocating a frequency band to a communication terminal by a base station that controls, in transmitting a signal to a communication terminal using a plurality of antennas, the transmission directivity of the plurality of antennas based on a known signal from the communication terminal, and the method includes: a first step of allocating a downlink frequency band for use in transmission to a communication terminal to the communication terminal; and a second step of allocating, to the communication terminal, an uplink frequency band for use in transmission of the known signal from a plurality of unit frequency bands lined in a frequency direction, wherein in the second step, parts of the plurality of unit frequency bands are allocated in order to the communication terminal as the uplink frequency band.

Effects of the Invention

According to the present invention, the transmission performance of the base station is improved.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a diagram showing the state in which an uplink radio resource and a downlink radio resource are allocated in an asymmetrical manner.

FIG. 7 is a flowchart showing an operation of the base station.

FIG. 13 is a diagram showing an example of the allocation of uplink radio resources to the communication terminal.

FIG. 14 is a diagram showing an example of the allocation of uplink radio resources to the communication terminal.

FIG. 15 is a diagram showing an example of the allocation of uplink radio resources to the communication terminal.

FIG. 16 is a diagram showing an example of the allocation of uplink radio resources to the communication terminal.

EMBODIMENT FOR CARRYING OUT THE INVENTION

Figure 1:
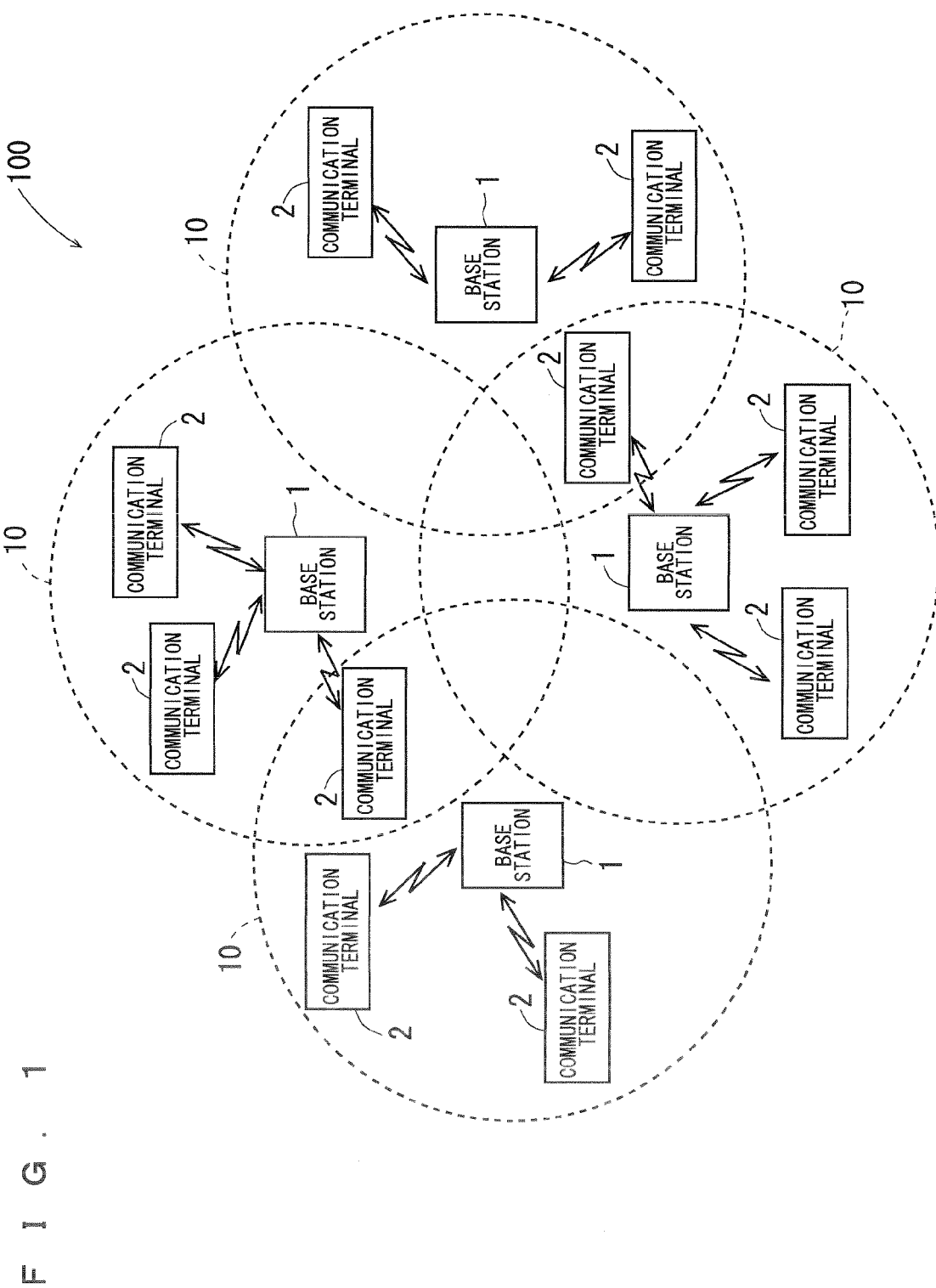
FIG. 1 is a diagram showing a configuration of a communication system.

FIG. 1 is a diagram showing a configuration of a communication system 100 including base stations 1 according to this embodiment. As shown in FIG. 1, in the communication system 100, a service area 10 of each base station 1 partially overlaps service areas 10 of the neighboring base stations 1. The plurality of base stations 1 are connected to a network (not shown) and are capable of communicating with each other through this network. A server device (not shown) is connected to the network, whereby each base station 1 is capable of communicating with the server device through the network.

Figure 2:
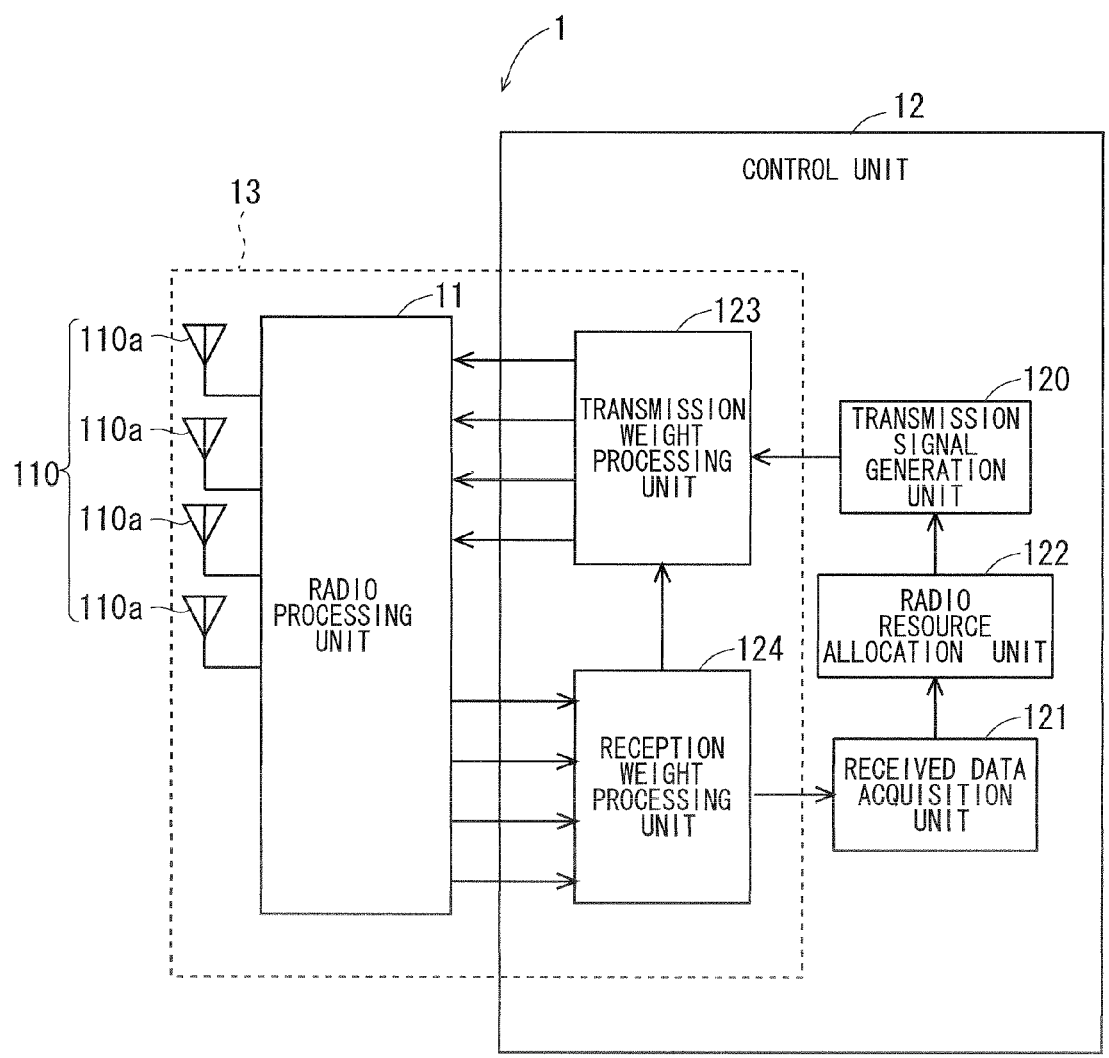
FIG. 2 is a diagram showing a configuration of a base station.

FIG. 2 is a diagram showing a configuration of each base station 1. The base station 1 communicates with a plurality of communication terminals in, for example, the TDMA/TDD (Time Division Multiple Access/Time Division Duplexing) scheme. The base station 1 also adopts the OFDMA (Orthogonal Frequency Division Multiple Access) scheme as a multiple access scheme. In the OFDMA scheme, an OFDM (Orthogonal Frequency Division Multiplexing) signal in which a plurality of orthogonal subcarriers are superimposed on each other is used. The base station 1 is capable of communicating with a plurality of communication terminals simultaneously by separately allocating, to each of the plurality of communication terminals, radio resources identified two-dimensionally on a time axis and a frequency axis. Also, the base station 1 includes an array antenna as a transmission/reception antenna and is capable of controlling the directivity of the array antenna in the adaptive array antenna scheme.

As shown in FIG. 2, the base station 1 includes a radio processing unit 11 and a control unit 12 that controls the radio processing unit 11. The radio processing unit 11 includes an array antenna 110 formed of a plurality of antennas 110a. The radio processing unit 11 performs an amplification process, down-conversion, an A/D conversion process, and the like on each of a plurality of received signals received through the array antenna 110, to thereby generate and output a plurality of received signals of a baseband.

The radio processing unit 11 performs a D/A conversion process, up-conversion, an amplification process, and the like on each of a plurality of transmission signals of a baseband generated by the control unit 12, to thereby generate a plurality of transmission signals of a carrier band. Then, the radio processing unit 11 respectively inputs the generated plurality of transmission signals of the carrier band to the plurality of antennas 110a forming the array antenna 110. Accordingly, the transmission signal is wirelessly transmitted from each antenna 110a.

The control unit 12 is composed of a CPU (Central Processing Unit), a DSP (Digital Signal Processor), a memory, and the like. In the control unit 12, the CPU and DSP execute the program in the memory, whereby a transmission signal generation unit 120, a received data acquisition unit 121, a radio resource allocation unit 122, a transmission weight processing unit 123, and a reception weight processing unit 124 are formed as functional blocks.

The transmission signal generation unit 120 generates transmission data to be transmitted to the communication terminal 2 being a communication target. Then, the transmission signal generation unit 120 generates transmission signals of a baseband including the generated transmission data. As many transmission signals as the plurality of antennas 110a constituting the array antenna 110 are generated.

The transmission weight processing unit 123 respectively sets, to a plurality of transmission signals generated by the transmission signal generation unit 120, a plurality of transmission weights for controlling the transmission directivity of the array antenna 110. Then, the transmission weight processing unit 123 performs IDFT (Inverse Discrete Fourier Transform) and the like on the plurality of transmission signals in which a plurality of transmission weights have been respectively set, and then, outputs the plurality of transmission signals to the radio processing unit 11.

The reception weight processing unit 124 performs DFT (Discrete Fourier Transform) on a plurality of received signals received from the radio processing unit 11, and then, respectively sets a plurality of reception weights for controlling the reception directivity of the array antenna 110. Then, the reception weight processing unit 124 combines the plurality of received signals in which the plurality of reception weights have been respectively set, to generate a new received signal.

The received data acquisition unit 121 performs a demodulation process and the like on the received signal newly generated by the reception weight processing unit 124, and acquires a known signal, control data, user data, and the like included in the received signal. In this manner, the control unit 12 acquires various types of information to be notified from the communication terminal 2.

In the base station 1 according to this embodiment, the radio processing unit 11, the transmission weight processing unit 123, and the reception weight processing unit 124 form a communication unit 13 that communicates with a plurality of communication terminals 2 while adaptively controlling the directivity of the array antenna 110. In communicating with the communication terminal 2, the communication unit 13 controls each of the reception directivity and transmission directivity of the array antenna 110 based on the known signal from the communication terminal 2. Specifically, the communication unit 13 is capable of setting the beam and null of the reception directivity of the array antenna 110 in various directions by the reception weight processing unit 124 adjusting a reception weight by which the received signal is multiplied. Also, the communication unit 13 is capable of setting the beam and null of the transmission directivity of the array antenna 110 in various directions by the transmission weight processing unit 123 adjusting a transmission weight by which the transmission signal is multiplied. The transmission weight can be obtained from the reception weight, and the reception weight can be obtained based on the known signal from the communication terminal 2.

The radio resource allocation unit 122 allocates, to each communication terminal 2 being a communication target, a downlink radio resource for use in the transmission to the communication terminal 2 (frequency band and communication period for use in downlink communication). The transmission signal generation unit 120 generates, based on the downlink radio resource allocated to the communication terminal 2 by the radio resource allocation unit 122, a transmission signal to be transmitted to this communication terminal 2 and inputs the transmission signal to the transmission weight processing unit 123 at a timing based on the downlink radio resource. Accordingly, a transmission signal to be transmitted to the communication terminal 2 is transmitted from the communication unit 13 using a downlink radio resource allocated to the communication terminal 2.

Also, the radio resource allocation unit 122 allocates, to each communication terminal 2 being a communication target, an uplink radio resource for use in the transmission from the communication terminal 2 to the base station 1 (frequency band and communication period for use in uplink communication). The transmission signal generation unit 120 generates and outputs a transmission signal for notifying the communication terminal 2 of the uplink radio resource allocated to the communication terminal 2 by the radio resource allocation unit 122. This enables the communication terminal 2 to know an uplink radio resource for use in the transmission to the base station 1, and transmits a signal to the base station 1 using the uplink radio resource.

<Configuration of Communication Frame>

Figure 3:
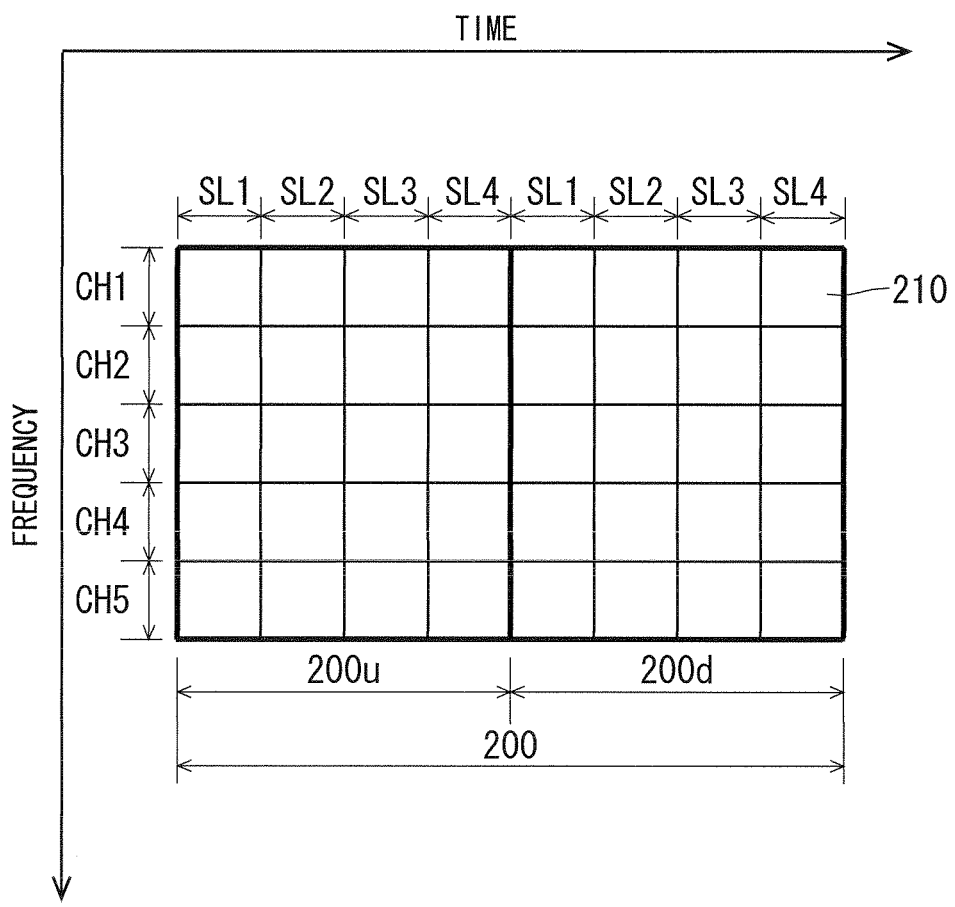
FIG. 3 is a diagram showing a configuration of a communication frame.

Next, a communication frame 200 for use in the communication between the base station 1 and the communication terminal 2 is described. FIG. 3 is a diagram showing a configuration of the communication frame 200. The configuration of the communication frame 200 according to this embodiment is similar to the configuration of the TDMA/TDD used in the XGP. Unlike the XGP, however, in the communication system 100, the uplink radio resource and downlink radio resource are allocated to the same communication terminal 2 in an asymmetrical manner in each communication frame 200. Here, "asymmetrical manner" means that the uplink radio resource and downlink radio resource are not always allocated to the same communication terminal 2 in a symmetrical manner in each communication frame 200. Therefore, even in the "asymmetrical manner", the uplink radio resource and downlink radio resource may be allocated to the same communication terminal 2 in a symmetrical manner in a communication frame 200, depending on a situation.

As shown in FIG. 3, the communication frame 200 is identified on a time-frequency plane in which a horizontal axis and a vertical axis represent time and frequency, respectively. One communication frame 200 is composed of an uplink frame 200u for use in the transmission of a signal from the communication terminal 2 to the base station 1 and a downlink frame 200d for use in the transmission of a signal from the base station 1 to the communication terminal 2.

Each of the uplink frame 200u and the downlink frame 200d includes a first slot SL1 to a fourth slot SL4 in the time direction and a first channel CH1 to an i-th channel CHi (i≥2) in the frequency direction. In this embodiment, for example, i=5, and as shown in FIG. 3, each of the uplink frame 200u and downlink frame 200d includes the first channel CH1 to the fifth channel CH5 in the frequency direction.

Hereinafter, if the first channel CH1 to the fifth channel CH5 need not to be particularly distinguished thereamong, each of them may be merely referred to as "channel CH". The channel CH is referred to as a sub-channel in the XGP.

Also, if the first slot SL1 to the fourth slot SL4 need not to be particularly distinguished thereamong, each of them may be merely referred to as "slot SL". The first slot SL1 to the fourth slot SL4 included in the uplink frame 200u may be referred to as a first uplink slot SL1 to a fourth uplink slot SL4, respectively. The first slot SL1 to the fourth slot SL4 included in the downlink frame 200d may be referred to as a first downlink slot SL1 to a fourth downlink slot SL4, respectively. If the first uplink slot SL1 to the fourth uplink slot SL4 need not to be particularly distinguished thereamong, each of them may be merely referred to as "uplink slot SL". If the first downlink slot SL1 to the fourth downlink slot SL4 need not to be particularly distinguished thereamong, each of them may be merely referred to as "downlink slot SL".

In the communication frame 200, the time width of one slot SL is set to 625 μs. Accordingly, the time length of each of the uplink frame 200u and the downlink frame 200d is 2.5 ms, and the time length of one communication frame 200 is 5 ms. The bandwidth of one channel CH is 900 kHz, and one channel CH includes 24 subcarriers.

One slot SL and one channel CH form a unit resource 210 being a radio resource allocation unit. In the XGP, the unit resource 210 is referred to as a PRU (Physical Resource Unit). Each of the uplink frame 200u and the downlink frame 200d includes 20 unit resources 210. With respect to each of the uplink frame 200u and the downlink frame 200d, the radio resource allocation unit 122 allocates, to each of the plurality of communication terminals 2, at least one unit resource 210 of the 20 unit resources 210 such that the unit resources 210 do not overlap each other among the plurality of communication terminals 2. When the radio resource allocation unit 122 allocates the unit resource 210 to each communication terminal 2, the communication unit 13 of the base station 1 communicates with each communication terminal 2 using the allocated unit resource 210. Each unit resource 210 for use in uplink communication includes a known signal for calculating a reception weight and a transmission weight, user data, and the like.

Hereinafter, a frequency band serving as a radio resource allocation unit in the frequency direction, such as a frequency band of one channel CH, is referred to as "unit frequency band".

The unit resource 210 belonging to the uplink frame 200u may be referred to as "uplink unit resource 210". The unit resource 210 belonging to the downlink frame 200d may be referred to as "downlink unit resource 210". Among the plurality of uplink unit resources 210 forming the uplink frame 200u, the uplink unit resource 210 to be allocated to the communication terminal 2 and used by the communication terminal 2 may be referred to as "uplink-use unit resource 210". Among the plurality of downlink unit resources 210 forming the downlink frame 200d, the downlink unit resource 210 to be allocated to the communication terminal 2 and used by the communication terminal 2 may be referred to as "downlink-use unit resource 210".

As described above, in the allocation of an uplink radio resource to the communication terminal 2 from the uplink frame 200u, the radio resource allocation unit 122 allocates, when viewed in the frequency direction, an uplink frequency band for use in uplink communication to the communication terminal 2 from a plurality of unit frequency bands. In the allocation of an uplink radio resource to the communication terminal 2 from the uplink frame 200u, the radio resource allocation unit 122 allocates, when viewed in the time direction, an uplink communication period to the communication terminal 2 from a plurality of slots SL.

Similarly, in the allocation of a downlink radio resource to the communication terminal 2 from the downlink frame 200d, the radio resource allocation unit 122 allocates, when viewed in the frequency direction, a downlink frequency band for use in downlink communication to the communication terminal 2 from the plurality of unit frequency bands. In the allocation of a downlink radio resource to the communication terminal 2 from the downlink frame 200d, the radio resource allocation unit 122 allocates, when viewed in the time direction, the downlink communication period to the communication terminal 2 from the plurality of slots SL.

In this embodiment, in the transmission of a signal to a communication terminal 2 using a downlink unit resource 210, the communication unit 13 of the base station 1 controls the transmission directivity of the array antenna 110 based on a known signal to be transmitted from the communication terminal 2 using the uplink unit resource 210 having the same frequency band as that of this downlink unit resource 210. That is, the communication unit 13 controls the transmission directivity of the array antenna 110 based on a known signal transmitted from the communication terminal 2 using the uplink-use unit resource 210 that includes the same channel CH as the channel CH included in the downlink-use unit resource 210 for the communication terminal 2 being a communication target.

Specifically, in the communication unit 13, the reception weight processing unit 124 calculates a reception weight based on a known signal to be transmitted from a communication terminal 2 being a communication target, with the use of the uplink-use unit resource 210 having the same frequency band as that of the downlink-use unit resource 210 for the communication terminal 2. In this case, the reception weight processing unit 124 uses a known signal to be transmitted using the uplink-use unit resource 210 which has the same frequency band as that of the downlink-use unit resource 210 and which is at a timing closest to this downlink-use unit resource 210, in the calculation of a reception weight. Then, the transmission weight processing unit 123 calculates, based on the reception weight obtained by the reception weight processing unit 124, a transmission weight to be set in a transmission signal to be transmitted in the downlink-use unit resource 210. This causes the beam related to the transmission directivity of the array antenna 110 to be directed toward the communication terminal 2 being a communication target. The reception weight is calculated based on, for example, a sequential estimation algorithm such as RLS (Recursive Least-Squares) algorithm.

<Method of Allocating Radio Resources>

Next, a method of allocating radio resources to the communication terminal 2 by the radio resource allocation unit 122 is described in detail.

Figure 4:
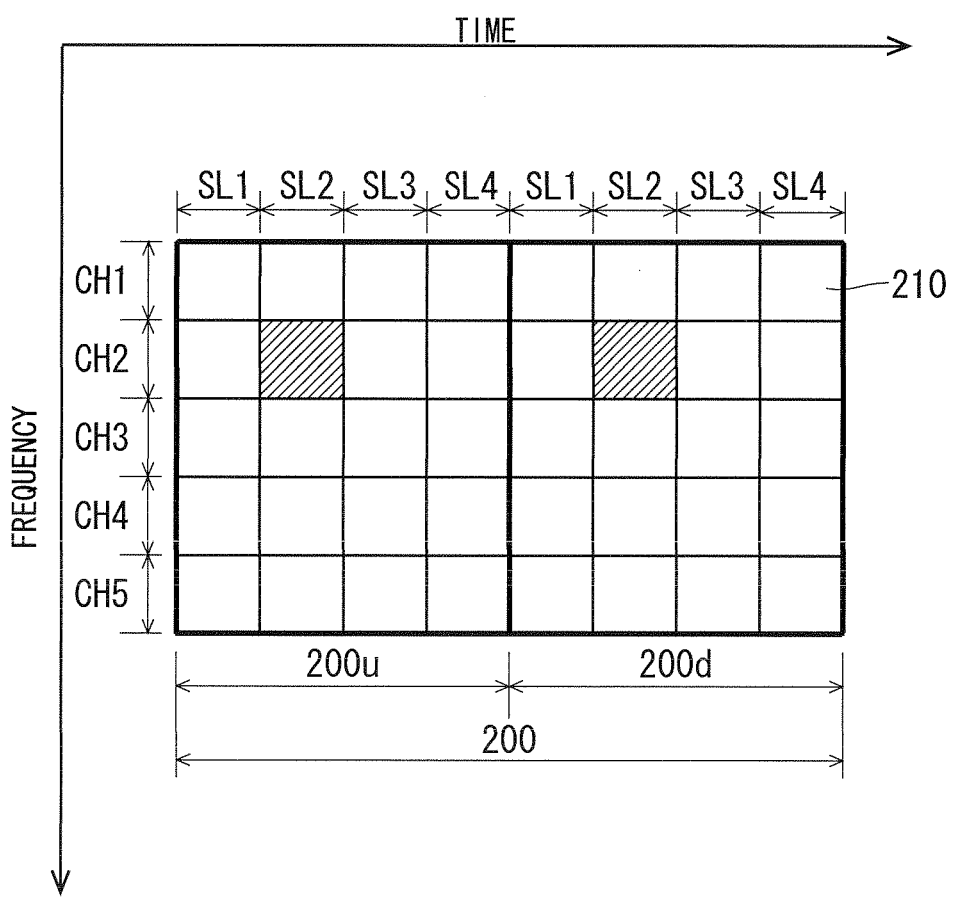
FIG. 4 is a diagram showing the state in which an uplink radio resource and a downlink radio resource are allocated in a symmetrical manner.

In the PHS and XGP, an uplink radio resource and a downlink radio resource are always allocated to the same communication terminal 2 in a symmetrical manner in each communication frame 200. FIG. 4 is a diagram showing the state of the above. In FIG. 4, unit resources 210 allocated to one communication terminal 2 being a communication target are diagonally shaded. Hereinafter, the communication terminal 2 that is targeted for description is referred to as "target communication terminal 2".

As shown in FIG. 4, the unit resources 210 at the same position are allocated to the target communication terminal 2 in the uplink frame 200u and the downlink frame 200d. In this case, therefore, in the transmission of a signal to a target communication terminal 2 using the downlink unit resource 210 allocated to the target communication terminal 2, the communication unit 13 can control the transmission directivity of the array antenna 110 based on a known signal transmitted from the communication terminal 2 in the uplink unit resource 210 belonging to the same communication frame 200 as that of the downlink unit resource 210. Therefore, the communication unit 13 can control the transmission directivity of the array antenna 110 based on a known signal transmitted from the target communication terminal 2 at a timing close to the timing of transmitting a signal to this communication terminal 2.

Meanwhile, in the communication system 100 according to this embodiment, an uplink radio resource and a downlink radio resource are allocated to the same communication terminal 2 in an asymmetrical manner in each communication frame 200, differently from the PHS and XGP. FIG. 5 is a diagram showing the state of the above. In FIG. 5, the unit resources 210 allocated to the target communication terminal 2 are diagonally shaded.

As shown in FIG. 5, in a case where the unit resources 210 of channels CH different from each other are allocated to the target communication terminal 2 in the uplink frame 200u and the downlink frame 200d, the channel CH (second channel CH2) to be used in downlink communication is not used in uplink communication. This results in that the communication unit 13 cannot receive, in a communication frame 200 in which a signal is transmitted to the target communication terminal 2, a known signal whose channel CH for use in downlink communication in the communication frame 200 has been used. Accordingly, the communication unit 13 performs omni-transmission to the target communication terminal 2 or controls the transmission directivity of the array antenna 110 based on a known signal to be transmitted from the target communication terminal 2 in the communication frame 200 preceding the communication frame 200 in which a signal is transmitted to the target communication terminal 2.

Figure 6:
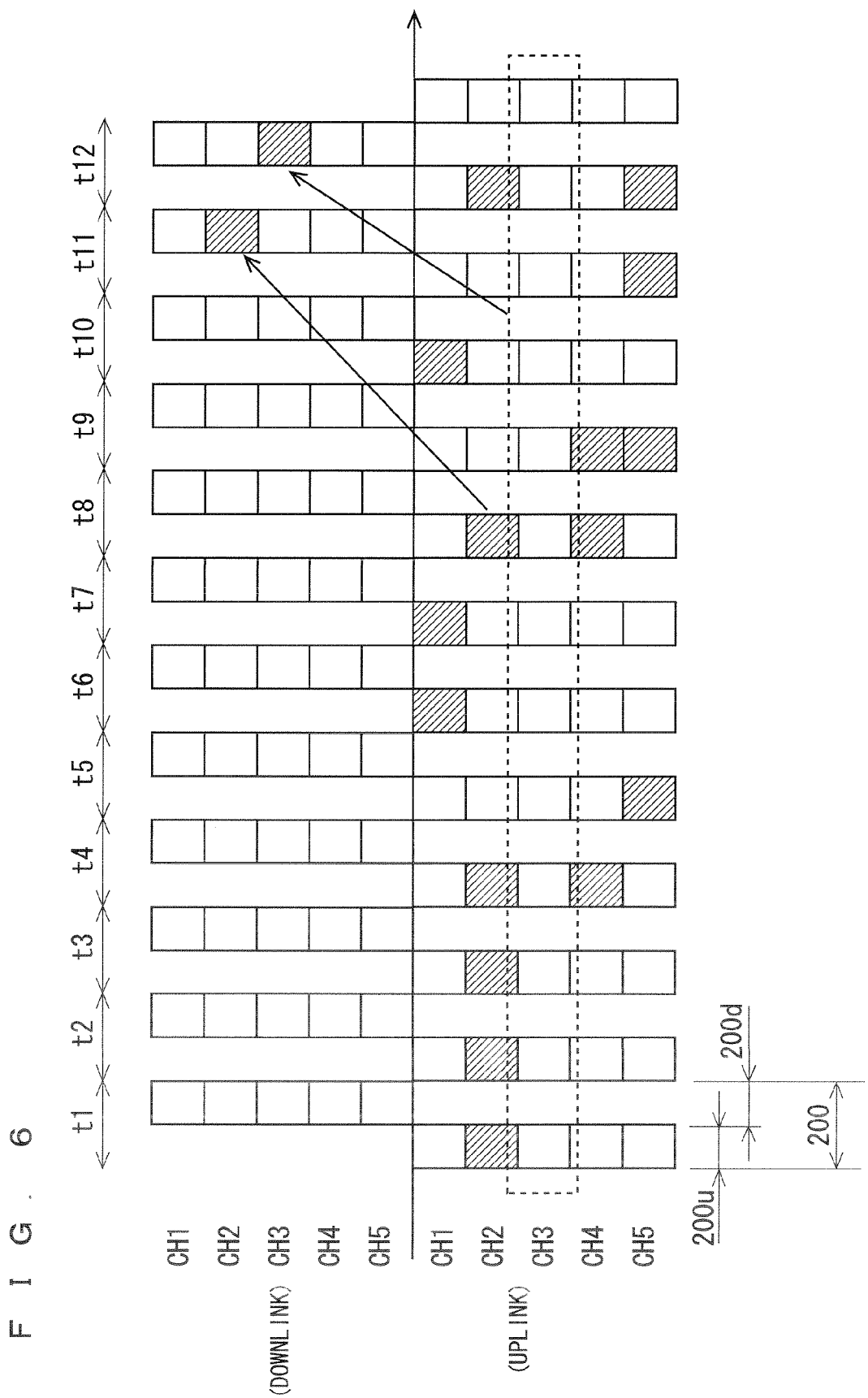
FIG. 6 is a diagram showing an example of the allocation of radio resources to the communication terminal.

FIG. 6 is a diagram showing an example of the allocation of radio resources to the target communication terminal 2 in a plurality of communication frames 200. In FIG. 6, the first slot SL1 to the fourth slot SL4 are collectively indicated by one square in each channel CH. In FIG. 6, when a channel CH is used in at least one slot SL of the first slot SL1 to the fourth slot SL4 in the uplink frame 200u or the downlink frame 200d, the portion of that channel CH is diagonally shaded.

As shown in FIG. 6, in a downlink frame 200d of a t11-th communication frame 200, the second channel CH2 is allocated to the target communication terminal 2. Meanwhile, in an uplink frame 200u of the t11-th communication frame 200, the second channel CH2 is not allocated to the target communication terminal 2. Accordingly, in the transmission of a signal using the second channel CH2 in the t11-th communication frame 200, the communication unit 13 cannot control the transmission directivity of the array antenna 110 based on a known signal to be transmitted from the target communication terminal 2 in the t11-th communication frame 200.

In the example of FIG. 6, the second channel CH2 is allocated to the target communication terminal 2 in an uplink frame 200u of a t8-th communication frame 200 preceding the t11-th communication frame 200 by three frames. Accordingly, in the transmission of a signal using the second channel CH2 in the t11-th communication frame 200, the communication unit 13 controls the transmission directivity of the array antenna 110 based on a known signal to be transmitted from the target communication terminal 2 in the t8-th communication frame 200.

In a downlink frame 200d of a t12-th communication frame 200, the third channel CH3 is allocated to the target communication terminal 2. In the example of FIG. 6, the third channel CH3 to be used in the t12-th communication frame 200 is not allocated to the target communication terminal 2 in the uplink frame 200u of any communication frame 200. Accordingly, in the transmission of a signal using the third channel CH3 in the t12-th communication frame 200, the communication unit 13 performs omni-transmission. That is, the communication unit 13 performs transmission without controlling the transmission directivity of the array antenna 110.

As described above, in a case where an uplink radio resource and a downlink radio resource are allocated to the same communication terminal 2 in an asymmetrical manner in each communication frame 200, the communication unit 13 is highly likely to perform omni-transmission to the target communication terminal 2 or control the transmission directivity of the array antenna 110 based on a known signal to be received from the target communication terminal 2 at a timing distanced from the timing of transmitting a signal to the target communication terminal 2. This results in that the transmission performance of the base station 1 may fail to be secured sufficiently.

In this embodiment, therefore, in a case of newly allocating a channel CH for uplink communication to the target communication terminal 2, the elapsed time since the last use of the channel CH in the uplink communication is obtained, so that a new channel CH for uplink communication is determined based on this elapsed time. This prevents the period in which each channel CH is not used from becoming longer. As a result, the transmission directivity of the array antenna 110 can be controlled based on a known signal received from the target communication terminal 2 at a timing close to the timing of transmitting a signal to the target communication terminal 2. This operation in the base station 1 is described below.

Figure 8:
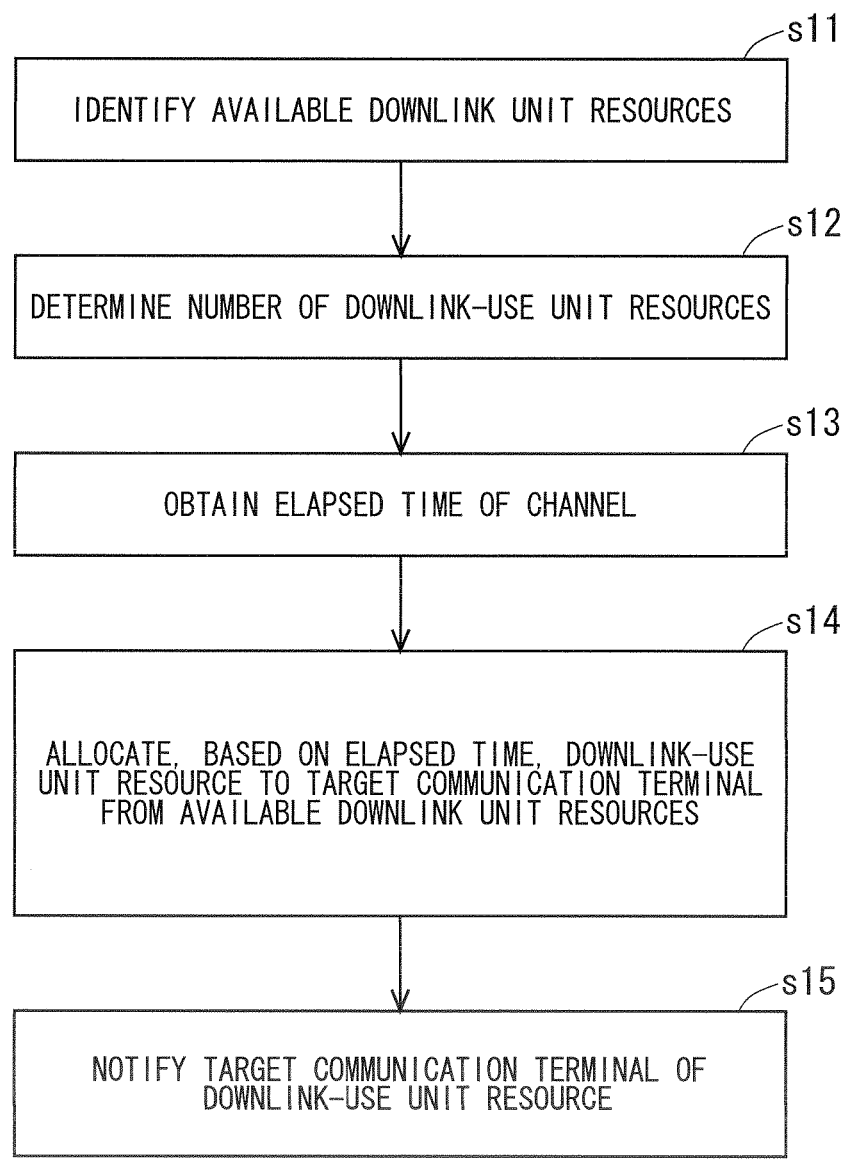
FIG. 8 is a flowchart showing an operation of the base station.

FIG. 7 is a flowchart showing the operation of the base station 1 in the case where the base station 1 allocates, to the target communication terminal 2, the uplink radio resource for use in communicating with the target communication terminal 2 in a communication frame 200. FIG. 8 is a flowchart showing the operation of the base station 1 in a case where the base station 1 allocates, to the target communication terminal 2, a downlink radio resource for use in communicating with the target communication terminal 2 in the same communication frame 200 as that of FIG. 7.

Hereinafter, in describing the method of allocating radio resources to the target communication terminal 2 in a communication frame 200, this communication frame 200 is referred to as "allocation target frame 200". The uplink frame 200u and downlink frame 200d belonging to the allocation target frame 200 are referred to as "allocation target uplink frame 200u" and "allocation target downlink frame 200d", respectively.

For example, in the communication frame 200 preceding the allocation target frame 200 by two frames, the base station 1 according to this embodiment allocates, to the target communication terminal 2, the uplink radio resource and downlink radio resource for use in the communication with the target communication terminal 2 in the allocation target frame 200 and also notifies the target communication terminal 2 of the allocation results. Hereinafter, the communication frame 200 in which the allocation of radio resources to the target communication terminal 2 is executed is referred to as "allocation processing execution frame 200".

In this embodiment, radio resources are allocated to the target communication terminal 2 at predetermined intervals. Irrespective of the presence or absence of a change made to the uplink-use unit resource 210 and downlink-use unit resource 210, in each communication frame 200, the target communication terminal 2 is notified of the uplink-use unit resource 210 and downlink-use unit resource 210 in the communication frame 200 two frames later. Accordingly, in a case where the process of allocating radio resources to the target communication terminal 2 is performed in the communication frame 200 in which the target communication terminal 2 is notified of an uplink-use unit resource 210 and a downlink-use unit resource 210, the target communication terminal 2 is notified of the uplink-use unit resource 210 and downlink-use unit resource 210 after the allocation process in this communication frame 200.

In the base station 1, when the allocation processing execution frame 200 appears, as shown in FIG. 7, in Step s1, the radio resource allocation unit 122 identifies available (allocatable) uplink unit resources 210 among 20 uplink unit resources 210 forming the allocation target uplink frame 200u. In Step s1, the uplink unit resource 210 to be used by the communication terminal 2 different from the target communication terminal 2, the uplink unit resource 210 whose interference level is high, and the like cannot be used. The interference wave level in the uplink unit resource 210 can be obtained by the control unit 12 based on the received signal to be output from the radio processing unit 11.

Then, in Step s2, the radio resource allocation unit 122 determines the number of uplink unit resources 210 to be used in the allocation target uplink frame 200u, that is, the number of uplink-use unit resources 210 based on, for example, an amount of to-be-transmitted data of the target communication terminal 2, which is notified from the target communication terminal 2.

Then, in Step s3, the radio resource allocation unit 122 obtains elapsed time T since the last use of each of the first channel CH1 to the fifth channel CH5 in uplink communication with the target communication terminal 2. That is, the radio resource allocation unit 122 obtains the elapsed time since the last use of each of a plurality of unit frequency bands lined in the frequency direction in uplink communication with the target communication terminal 2. In this embodiment, the elapsed time T is represented as the number of uplink slots SL. Specifically, the elapsed time T of a channel CH is represented as the number of uplink slots SL existing between the end of the uplink slot SL in which this channel CH was used last in uplink communication and the beginning of the allocation target frame 200. The elapsed time T of a channel CH is represented by Expression (1) below if the slot number of the uplink slot SL in which this channel CH was used last in uplink communication is SN, the total number of slots SL in the uplink frame 200u is ST (in this embodiment, ST=4), and the number of communication frames 200 existing between the communication frame 200 in which this channel CH was used last in uplink communication and the allocation target frame 200 is FN.

$$T = (ST - SN) + FN \times ST \quad (1)$$

Note that in a case where a channel CH has not been used even once in uplink communication with the target communication terminal 2 before the allocation target frame 200, the elapsed time T of that channel CH is infinite.

In this embodiment, ST=4, so that Expression (2) below can be obtained by substituting this into Expression (1).

$$T = (4 - SN) + FN \times 4 \quad (2)$$

Figure 9:
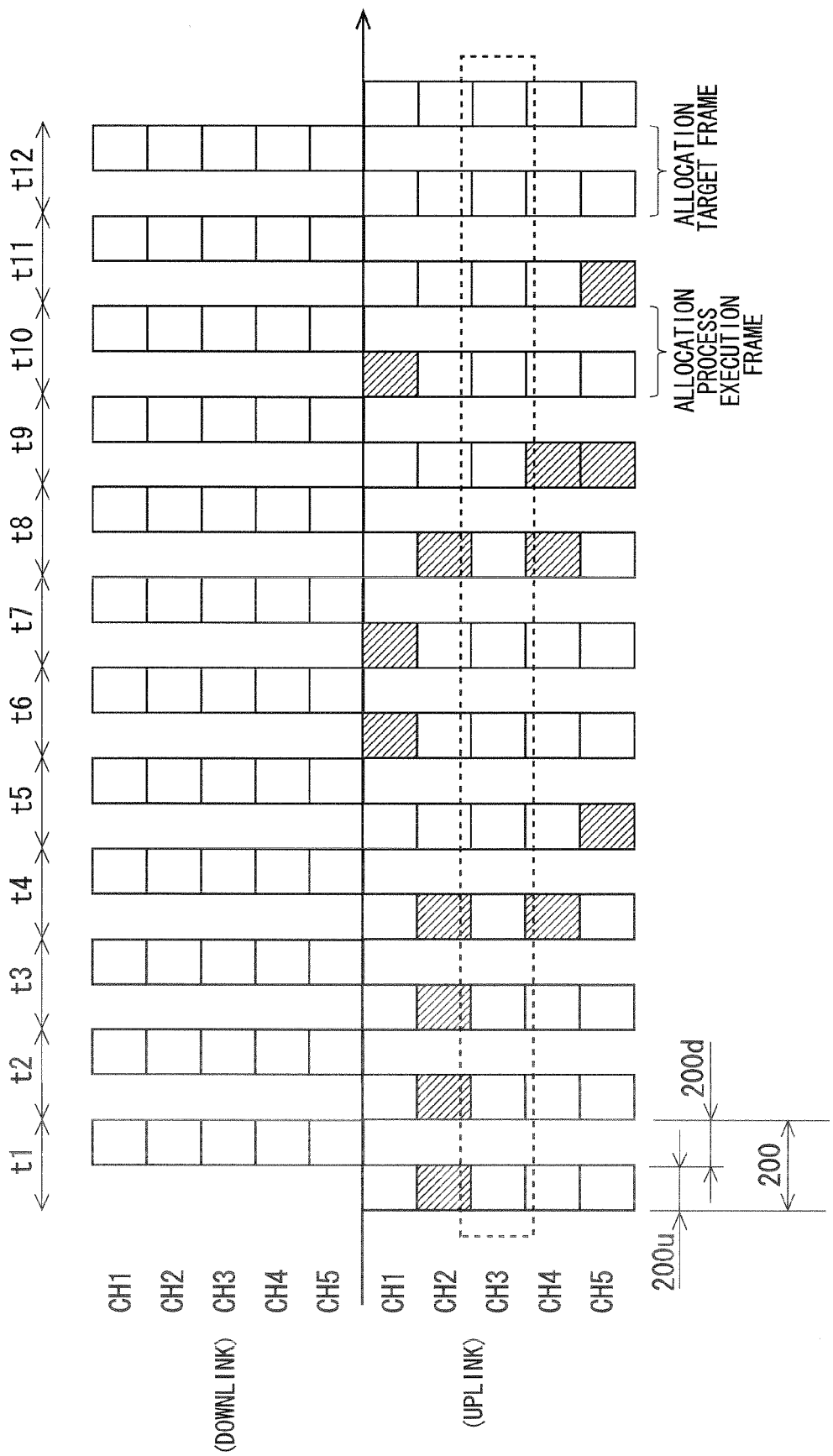
FIG. 9 is a diagram showing an example of the allocation of uplink radio resources to the communication terminal.

FIG. 9 is a diagram corresponding to FIG. 6 described above, which is a diagram showing an example of the allocation of uplink radio resources to the target communication terminal 2 in a plurality of communication frames 200. An example of the calculation of elapsed time T of each channel CH in a case where a t12-th communication frame 200 is the allocation target frame 200 is described with reference to FIG. 9. In the case where the t12-th communication frame 200 is an allocation target frame, a t10-th communication frame 200 is the allocation processing execution frame 200.

If the uplink slot SL in which the first channel CH1 was used last is the first uplink slot SL1 of the t10-th communication frame 200 before the allocation target frame 200, SN=1 and FN=1. Therefore, the elapsed time T of the first channel CH1 is "7" from Expression (2).

If the uplink slot SL in which the second channel CH2 was used last is a second uplink slot SL2 of a t8-th communication frame 200 before the allocation target frame 200, SN=2 and FN=3. Therefore, the elapsed time T of the second channel CH2 is "14" from Expression (2).

The third channel CH3 has not been used in uplink communication with the target communication terminal 2 before the t12-th communication frame 200, and thus, the elapsed time T of the third channel CH3 is infinite.

If the uplink slot SL in which the fourth channel CH4 was used last is a third uplink slot SL3 of a t9-th communication frame 200 before the allocation target frame 200, SN=3 and FN=2. Therefore, the elapsed time T of the fourth channel CH4 is "9".

If the uplink slot SL in which the fifth channel CH5 was used last is a fourth uplink slot SL4 of a t11-th communication frame 200 before the allocation target frame 200, SN=4 and FN=0. Thus, the elapsed time T of the fifth channel CH5 is "0".

In this embodiment, the allocation processing execution frame 200 is set to precede the allocation target frame 200 by two frames. Therefore, considering only the use of channels CH before the allocation processing execution frame 200 being a reference in calculating the elapsed time T, the t9-th communication frame 200 is the communication frame 200 in which the fifth channel CH5 was used last.

In this embodiment, the use of a channel CH before the allocation target frame 200 being a reference is considered in calculating the elapsed time T, and thus, the use of a channel CH after the allocation processing execution frame 200 and before the allocation target frame 200 is also taken into consideration. Accordingly, as described above, the t11-th communication frame 200 is the communication frame 200 in which the fifth channel CH5 was used last.

The uplink radio resource to be used in the communication frame 200 between the allocation processing execution frame 200 and the allocation target frame 200 has been determined before the allocation processing execution frame 200. Accordingly, the radio resource allocation unit 122 can identify that the fifth channel CH5 is used in the t11-th communication frame 200.

Unlike the example above, the elapsed time T of the channel CH may be calculated in consideration of the use of the channel CH before the allocation processing execution frame 200 being a reference.

Figure 10:
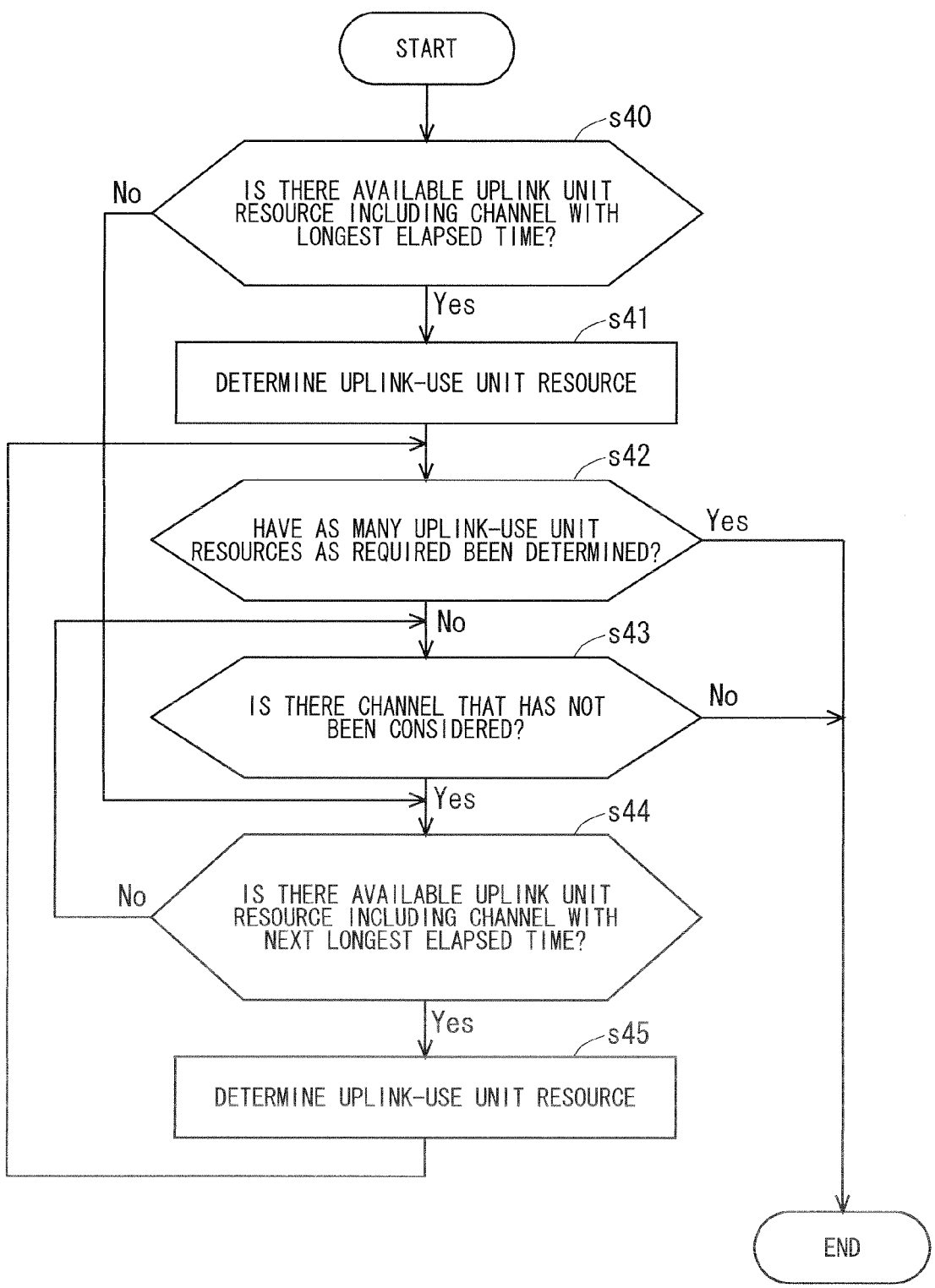
FIG. 10 is a flowchart showing an operation of the base station.

After executing Step s3, in Step s4, the radio resource allocation unit 122 allocates, based on the elapsed time T determined in Step s3, as many uplink-use unit resources 210 as the number determined in Step s2 to the target communication terminal 2 from available unit resources 210. The process in Step s4 is described below in detail. FIG. 10 is a flowchart specifically showing the process of Step s4. In Step s4, a channel CH whose elapsed time T is longer is taken as a channel CH more preferentially used in the allocation target frame 200. That is, a channel CH whose elapsed time T is longer is more preferentially allocated to the target communication terminal 2.

As shown in FIG. 10, first, in Step s40, the radio resource allocation unit 122 judges whether there is an available uplink unit resource 210 including a channel CH with the longest elapsed time T. When judging that there is the corresponding available uplink unit resource 210 in Step s40, in Step s41, the radio resource allocation unit 122 takes the corresponding available uplink unit resource 210 as the uplink-use unit resource 210. Accordingly, the channel CH with the longest elapsed time T is allocated to the target communication terminal 2 for uplink communication. In a case where there are a plurality of corresponding available uplink unit resources 210, the radio resource allocation unit 122 takes any one of them as the uplink-use unit resource 210. Meanwhile, when judging in Step s40 that there is no corresponding available uplink unit resource 210, the radio resource allocation unit 122 executes Step s44 described below.

After executing Step s41, in Step s42, the radio resource allocation unit 122 judges whether as many uplink-use unit resources 210 as the number determined in Step s2, that is, as many uplink-use unit resources 210 as required have been determined. When judging in Step s42 that as many as uplink-use unit resources 210 as required have been determined, the process of Step s4 is completed. Meanwhile, when judging in Step s42 that as many uplink-use unit resources 210 as required have not been determined, in Step s43, the radio resource allocation unit 122 judges whether there is a channel CH that has not been considered to be allocated to the target communication terminal 2. When judging in Step s43 that there is a corresponding channel CH, in Step s44, the radio resource allocation unit 122 judges whether there is an available unit resource 210 including a channel CH with the next longest elapsed time. Meanwhile, when judging in Step s43 that there is no corresponding channel CH, that is, when considering allocation to all channels CH, the process of Step s4 is completed.

When judging in Step s44 that there is a corresponding available uplink unit resource 210, in Step s45, the radio resource allocation unit 122 takes the corresponding available uplink unit resource 210 as the uplink-use unit resource 210. Accordingly, the channel CH with the next longest elapsed time T is allocated to the target communication terminal 2 for uplink communication. In a case where there are a plurality of corresponding available uplink unit resources 210, the radio resource allocation unit 122 takes any one of them as the uplink-use unit resource 210. After that, the radio resource allocation unit 122 executes Step s42 again, and thereafter, the base station 1 operates in a similar manner.

When it is judged in Step s44 that there is no corresponding available uplink unit resource 210, Step s43 is executed again. After that, the base station 1 operates in a similar manner.

As can be understood from the description above, in this embodiment, when a channel CH for uplink communication is newly allocated to the target communication terminal 2, a channel CH with longer elapsed time T is taken as a channel CH more preferentially allocated to the target communication terminal 2. This results in that when a channel CH for uplink communication is newly allocated to the target communication terminal 2, a channel CH that has not been used for a longer period may be more likely to be allocated to the target communication terminal 2. In the example of FIG. 9 described above, the elapsed time T becomes longer in order of the third channel CH3, second channel CH2, fourth channel CH4, first channel CH1, and fifth channel CH5, whereby those channels are more easily allocated to the target communication terminal 2 as ones for uplink communication in this order.

After executing Step s4, in Step s5, the transmission signal generation unit 120 generates a transmission signal including notification information for notifying the uplink unit resource 210 allocated to the target communication terminal 2 by the radio resource allocation unit 122, and then outputs the transmission signal to the communication unit 13. The communication unit 13 transmits the received transmission signal to the target communication terminal 2. As a result, the target communication terminal 2 is notified of the uplink unit resource 210 for use in uplink communication in the allocation target frame 200. When the allocation target frame 200 appears, the target communication terminal 2 transmits a signal including a known signal and user data to the base station 1 using the uplink unit resource 210 notified from the base station 1.

As described above, in this embodiment, when an uplink radio resource is newly allocated to the target communication terminal 2, a channel CH that has not been used for a longer period may be more likely to be allocated to the target communication terminal 2. Therefore, it is possible to prevent the period in which each of the first channel CH1 to the fifth channel CH5 is not allocated for uplink communication to the target communication terminal 2 from becoming longer. As a result, in performing downlink communication with the target communication terminal 2, the base station 1 can control the transmission directivity of the array antenna 110 based on the known signal received from the target communication terminal 2 at a timing close to the timing of downlink communication. This leads to an improvement in transmission performance of the base station 1.

Next, the operation of the base station 1 in allocating a downlink radio resource, which is used in communicating with the target communication terminal 2 when the base station 1 communicates with the target frame 200, to the target communication terminal 2 is described with reference to FIG. 8.

When the allocation processing execution frame 200 appears, as shown in FIG. 8, in the base station 1, the radio resource allocation unit 122 identifies available downlink unit resources 210 among 20 downlink unit resources 210 forming an allocation target downlink frame 200d in Step s11. In Step s11, a downlink unit resource 210 to be allocated to another communication terminal 2 different from a target communication terminal 2 and a downlink unit resource 210 whose interference level is high cannot be used. In this embodiment, each communication terminal 2 is configured to notify the base station 1 of the reception state of a signal from the base station 1, and accordingly, the control unit 12 of the base station 1 can identify a downlink unit resource 210 whose interference level is high based on the reception state notified from each communication terminal 2.

Then, in Step s12, the radio resource allocation unit 122 determines the number of downlink unit resources 210 for use in the allocation target downlink frame 200d, that is, the number of downlink-use unit resources 210 based on, for example, a data amount of data to be transmitted to the target communication terminal 2.

Then, in Step s13, the radio resource allocation unit 122 obtains, as to each of the first channel CH1 to the fifth channel CH5, the elapsed time T since the last use in uplink communication with the target communication terminal 2, as in Step s3 described above. In this case, the channel CH of the uplink unit resource 210 allocated to the target communication terminal 2 in Step s4 described above is handled as one used in uplink communication with the target communication terminal 2. That is, in Step s13, the usage of the channels CH before the allocation target downlink frame 200d is taken into consideration in calculation of the elapsed time T. The elapsed time T of a channel CH is represented by the number of uplink slots SL existing between the end of the uplink slot SL in which this channel CH was used last for uplink communication and the beginning of the allocation target downlink frame 200.

Figure 11:
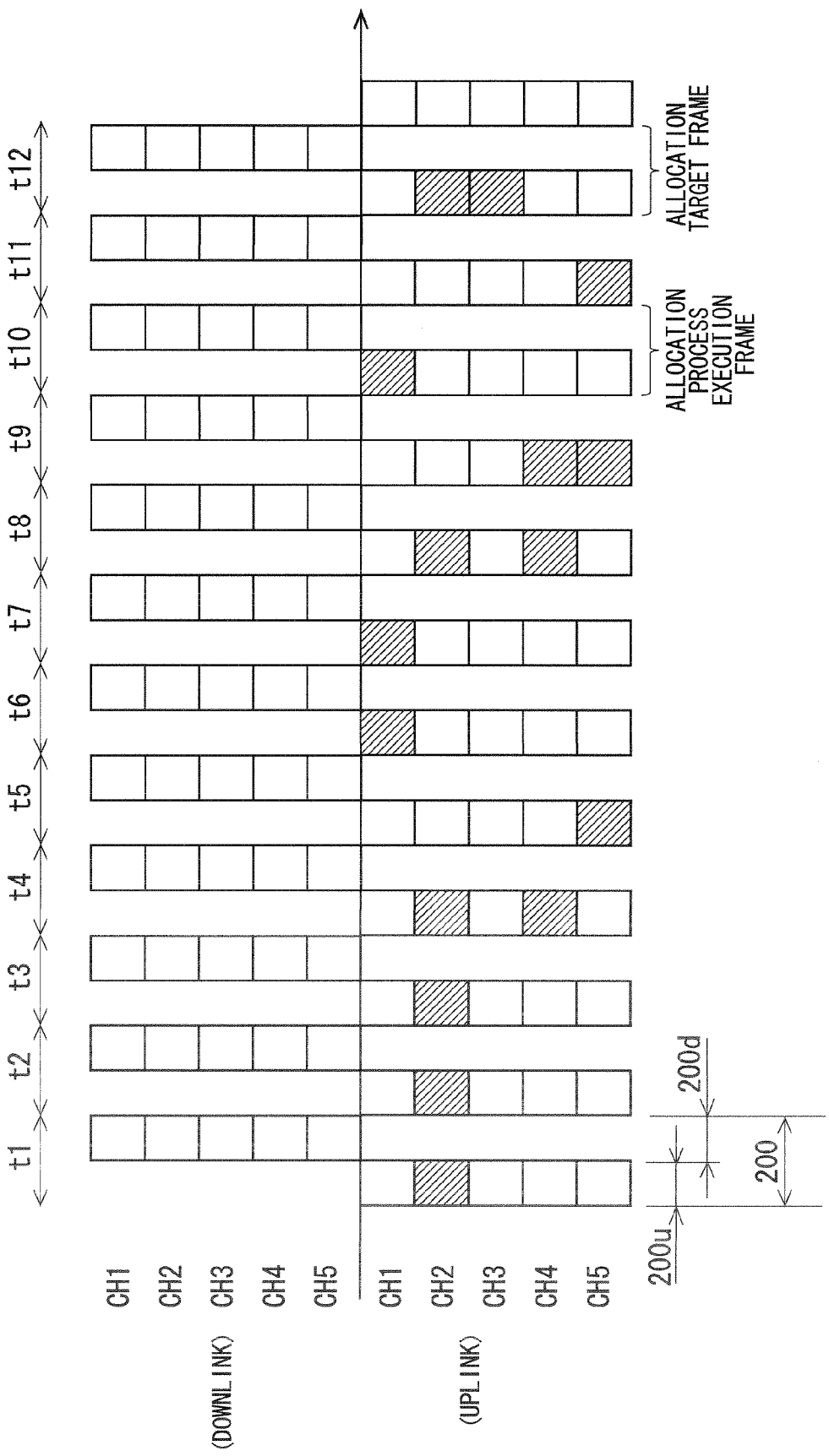
FIG. 11 is a diagram showing an example of the allocation of uplink radio resources to the communication terminal.

FIG. 11 shows the uplink unit resources 210 to be used in the t12-th communication frame 200 by diagonal lines in the example of FIG. 9 described above. An example of calculating the elapsed time T in Step s13 is described below with reference to FIG. 11.

The first channel CH1 is not used in the allocation target uplink frame 200u, and thus, the elapsed time T thereof is "11", which is obtained by adding an amount of four uplink slots SL in the allocation target uplink frame 200u to the value of the example of FIG. 9.

If the second channel CH2 is used in the first uplink slot SL1 of the allocation target uplink frame 200u, the elapsed time T thereof is "3" from Expression (2).

If the third channel CH3 is used in the fourth uplink slot SL4 of the allocation target uplink frame 200u, the elapsed time T thereof is "0" from Expression (2).

The fourth channel CH4 is not used in the allocation target uplink frame 200u, and thus, the elapsed time T thereof is "13", which is obtained by adding an amount of four uplink slots SL in the allocation target uplink frame 200u to a value in the example of FIG. 9.

The fifth channel CH5 is not used in the allocation target uplink frame 200u, and thus, the elapsed time T thereof is "4", which is obtained by adding an amount of four uplink slots SL in the allocation target uplink frame 200u to a value in the example of FIG. 9.

As described above, the elapsed time T becomes shorter in order of the third channel CH3, second channel CH2, fifth channel CH5, first channel CH1, and fourth channel CH4 in the example of FIG. 11.

Figure 12:
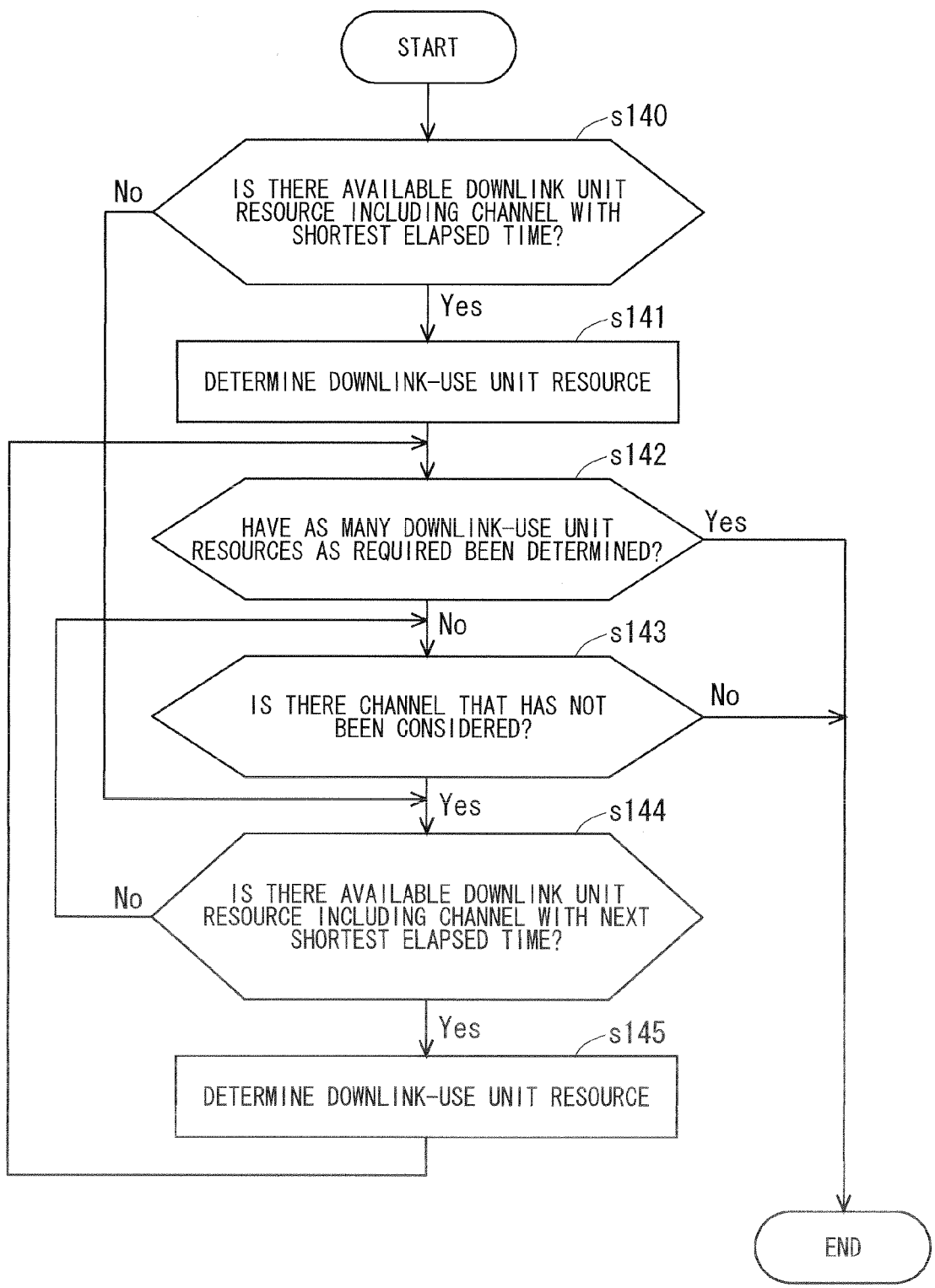
FIG. 12 is a flowchart showing an operation of the base station.

After executing Step s13, in Step s14, the radio resource allocation unit 122 allocates, to the target communication terminal 2, as many downlink-use unit resources 210 as the number determined in Step s12 from available downlink unit resources 210 based on the elapsed time T obtained in Step s13. The process of Step s14 is described below in detail. FIG. 12 is a flowchart showing the process of Step s14 in detail. In Step s14, a channel CH with a shorter elapsed time T is a channel CH less preferentially used in the allocation target downlink frame 200d.

As shown in FIG. 12, first, in Step s140, the radio resource allocation unit 122 judges whether there is an available downlink unit resource 210 including the channel CH with the shortest elapsed time T. When judging in Step s140 that there is a corresponding available downlink unit resource 210, in Step s141, the radio resource allocation unit 122 takes the corresponding available downlink unit resource 210 as a downlink-use unit resource 210. In a case where there are a plurality of corresponding available downlink unit resources 210, the radio resource allocation unit 122 takes any one of them as a downlink-use unit resource 210. Meanwhile, when judging in Step s140 that there is no corresponding available downlink unit resource 210, the radio resource allocation unit 122 executes Step s144 described below.

After executing Step s141, in Step s142, the radio resource allocation unit 122 judges whether as many downlink-use unit resources 210 as the number determined in Step s12, that is, as many downlink-use unit resources 210 as required have been determined. When it is judged in Step s142 that as many downlink-use unit resources 210 as required have been determined, the process of Step s14 is completed. Meanwhile, when judging in Step s142 that as many downlink-use unit resources 210 as required have not been determined, in Step s143, the radio resource allocation unit 122 judges whether there is a channel CH that has not been considered to be allocated to the target communication terminal 2. When judging in Step s143 that there is a corresponding channel CH, in Step s144, the radio resource allocation unit 122 judges whether there is a corresponding downlink unit resource 210 including a channel CH with the second shortest elapsed time.

Meanwhile, when it is judged in Step s143 that there is no corresponding channel CH, the process of Step s14 is completed.

When judging in Step s144 that there is a corresponding available downlink unit resource 210, in Step s145, the radio resource allocation unit 122 takes a corresponding available downlink unit resource 210 as the downlink-use unit resource 210. In a case where there are a plurality of corresponding available downlink unit resources 210, the radio resource allocation unit 122 takes any one of them as the downlink-use unit resource 210. After that, the radio resource allocation unit 122 executes Step s142 again, and thereafter, the base station 1 operates in a similar manner.

When it is judged in Step s144 that there is no corresponding available downlink unit resource 210, Step s143 is executed again. After that, the base station 1 operates in a similar manner.

As can be understood from the description above, in this embodiment, when a channel CH for downlink communication is newly allocated to the target communication terminal 2, a channel CH with shorter elapsed time T is taken as a channel CH more preferentially allocated to the target communication terminal 2. This results in that when a channel CH for downlink communication is newly allocated to the target communication terminal 2, a channel CH that has not been used for uplink communication for a shorter period may be more likely to be allocated to the target communication terminal 2. In the example of FIG. 11 described above, the elapsed time T becomes shorter in order of the third channel CH3, second channel CH2, fifth channel CH5, first channel CH1, and fourth channel CH4, whereby those channels are more easily allocated to the target communication terminal 2 as ones for downlink communication in this order.

After executing Step s14, in Step s15, the transmission signal generation unit 120 generates a transmission signal including notification information for notifying the downlink unit resource 210 allocated to the target communication terminal 2 by the radio resource allocation unit 122, and then outputs the transmission signal to the communication unit 13. The communication unit 13 transmits the received transmission signal to the target communication terminal 2. As a result, the target communication terminal 2 is notified of the downlink unit resource 210 for use in downlink communication in the allocation target frame 200.

The allocation processing execution frame 200 concludes, and then, the allocation target frame 200 appears, whereby the base station 1 receives, for example, a known signal to be transmitted by the target communication terminal 2 using the channel CH for uplink communication allocated to the target communication terminal 2 by the allocation processing execution frame 200. Then, the base station 1 transmits a transmission signal to be transmitted to the target communication terminal 2 using the channel CH for downlink communication allocated to the target communication terminal 2 in the allocation processing execution frame 200. In this case, the communication unit 13 controls the transmission directivity of the array antenna 110 based on a known signal which is transmitted from the target communication terminal 2 using the same channel CH as the channel CH for downlink communication and which is transmitted from the target communication terminal 2 at a timing closest to the allocation target downlink frame 200d.

Note that if the channel CH with long elapsed time T is allocated to the target communication terminal 2 for downlink communication, the timing at which the base station 1 transmits a known signal using this channel CH and the timing at which the target communication terminal 2 transmits a known signal using this channel CH are considerably apart from each other. Therefore, a channel CH whose elapsed time T is larger than a threshold needs not to be allocated to the target communication terminal 2 for downlink communication in Step s14 described above.

As described above, in this embodiment, when a channel CH for downlink communication is newly allocated to the target communication terminal 2, a channel CH that has not been used for uplink communication for a shorter period is more likely to be allocated to the target communication terminal 2. Accordingly, the base station 1 can control the transmission directivity of the array antenna 110 based on the known signal received at a timing close to the timing of performing downlink communication. This leads to an improvement in transmission performance of the base station 1.

As described above, in this embodiment, with the use of the elapsed time T when a channel CH for uplink communication is allocated to the communication terminal 2, the base station 1 can control the transmission directivity of the array antenna 110 based on the known signal received from the target communication terminal 2 at a timing close to a timing of performing downlink communication. Therefore, a channel CH for downlink communication may be allocated to the communication terminal 2 without using the elapsed time T. Even in this case, the transmission performance of the base station 1 is improved.

As described above, in newly allocating a channel CH for uplink communication to a communication terminal 2, the base station 1 according to this embodiment determines a new channel CH to be allocated to the communication terminal 2 based on the elapsed time T since the last use of the channel CH for uplink communication. In other words, in newly allocating an uplink frequency band for uplink communication to a communication terminal 2, the base station 1 determines an uplink frequency band to be newly allocated to the communication terminal 2 based on the elapsed time since the last use of the unit frequency band (frequency band of the channel CH) for uplink communication. This enables to preferentially allocate, to the communication terminal 2, a unit frequency band whose elapsed time since the last use is long for uplink communication. Accordingly, the base station 1 can control the transmission directivity of the array antenna 110 based on a known signal received from a communication terminal 2 at a timing close to the timing of transmitting a signal to the communication terminal 2. This results in that a beam related to the transmission directivity of the array antenna 110 can be appropriately directed to the communication terminal 2, leading to an improvement in transmission performance of the base station 1.

<First Modification>

While one type of multi-carrier communication, OFDMA, is used in communication between the base station 1 and the communication terminal 2 in the embodiment described above, single carrier communication may be used. In a case where the base station 1 and the communication terminal 2 perform single carrier communication and a plurality of unit frequency bands need to be allocated to the communication terminal 2, the plurality of continuous unit frequency bands need to be allocated. This is for enabling to transmit, in one carrier (carrier wave), a signal in a band formed of a plurality of unit frequency bands allocated to the communication terminal 2.

In a case where the base station 1 and the communication terminal 2 perform single carrier communication in the uplink direction and a plurality of continuous unit frequency bands are allocated to the target communication terminal 2 for uplink communication, a plurality of continuous unit frequency bands are allocated to the target communication terminal 2 such the plurality of continuous unit frequency bands include the unit frequency band with the largest elasped time T. This enables to control the transmission directivity of the array antenna 110 based on the known signal received from the communication terminal 2 at a timing close to the timing of transmitting a signal to this communication terminal 2, as in the embodiment described above. Although a plurality of combinations are conceivable as a plurality of continuous unit frequency bands including a unit frequency band having the largest elapsed time T, it is desired to allocate, to the target communication terminal 2, the combination in which the total amount of the elapsed time T for the plurality of unit frequency bands is largest from those combinations.

In a case where the base station 1 and the communication terminal 2 perform single carrier communication in the downlink direction and a plurality of continuous unit frequency bands are allocated to the target communication terminal 2 for downlink communication, a plurality of continuous unit frequency bands are allocated to the target communication terminal 2 such that a plurality of continuous unit frequency bands include the unit frequency band with the smallest elapsed time T. This enables to control the transmission directivity of the array antenna 110 based on the known signal received from the communication terminal 2 at a timing close to the timing of transmitting a signal to this communication terminal 2, as in the embodiment described above. Although a plurality of combinations are conceivable as a plurality of continuous unit frequency bands including a unit frequency band having the smallest elapsed time T, it is desired to allocate, to the target communication terminal 2, the combination in which the total amount of the elapsed time T for the plurality of unit frequency bands is smallest among those combinations.

<Second Modification>

While a channel CH for use in downlink communication with the target communication terminal 2 is not taken into consideration in allocating a channel CH for uplink communication to the target communication terminal 2 in the embodiment described above, a channel CH (unit frequency band) not to be used in downlink communication with the target communication terminal 2 is not required to be allocated to the target communication terminal 2 for uplink communication. Accordingly, in a case where the transmission directivity of the array antenna 110 is controlled based on the known signal from the target communication terminal 2, unnecessary transmission of a known signal from the target communication terminal 2 can be prevented. This enables to effectively use channels CH for uplink communication. This modification is described below in detail.

As described above, in allocating a downlink radio resource to the target communication terminal 2 in the allocation processing execution frame 200, the radio resource allocation unit 122 cannot use a downlink unit resource 210 whose interference level is high. In this case, if an interference level of a specific channel CH is large, all the interference levels of four downlink unit resources 210, which include the channel CH and also respectively include the first downlink slot SL1 to the fourth downlink slot SL4, become large. In this case, the channel CH is not allocated to the target communication terminal 2 for downlink communication. When an interference level of a channel CH increases, that state is kept for a while in many cases. Accordingly, a channel CH, which has been judged to be unable to be allocated to the target communication terminal 2 for downlink communication in the allocation processing execution frame 200, is not used for downlink communication for a while even after the allocation target frame 200.

As described above, in the allocation processing execution frame 200, a channel CH judged to have a high interference level is not to be allocated to the target communication terminal 2 for downlink communication for a while, and thus, the allocation of such a channel CH to the target communication terminal 2 for uplink communication is avoided.

For example, in the example of FIG. 9, in a case where all the interference levels of four downlink unit resources including the third channel CH3 are large and the third channel CH3 is not to be allocated to the target communication terminal 2 for downlink communication, even if the elapsed time T of the third channel CH3 is largest, the allocation of the third channel CH3 to the target communication terminal 2 for uplink communication is avoided. In this case, the second channel CH2, fourth channel CH4, first channel CH1, and fifth channel CH5 are more easily allocated to the target communication terminal 2 for uplink communication in the stated order.

The allocation of a channel CH (unit frequency band), which is not to be used in downlink communication with the target communication terminal 2, to the target communication terminal 2 for uplink communication is avoided as described above, whereby unnecessary transmission of a known signal from the target communication terminal 2 can be prevented. This enables to effectively use channels CH (unit frequency bands) for uplink communication.

<Third Modification>

Although the channels CH for uplink communication are newly allocated to the target communication terminal 2 based on the elapsed time T of the channel CH in the embodiment described above, parts of a plurality of channels CH may be allocated to the target communication terminal 2 for uplink communication in order without using the elapsed time T. That is, parts of a plurality of unit frequency bands may be allocated to the target communication terminal 2 for uplink communication in turn. Accordingly, a channel CH (unit frequency band) to be allocated to the target communication terminal 2 for uplink communication changes per allocation processing execution frame 200. Various modes are conceivable regarding the number of allocation (allocation unit number) in one allocation process and the order of allocation (allocation order) in one allocation process.

For example, when the first channel CH1 to the fifth channel CH5 are individually allocated to the target communication terminal 2, as shown in FIG. 13, the first channel CH1 to the fifth channel CH5 may be allocated to the target communication terminal 2 one by one in this order. Alternatively, the first channel CH1, fifth channel CH5, third channel CH3, fourth channel CH4, and second channel CH2 may be allocated to the target communication terminal 2 one by one in this order. In FIG. 13 and FIGS. 14 to 16 described below, the process of allocating radio resources to the target communication terminal 2 is executed for every three frames.

When two of the first channel CH1 to the fifth channel CH5 are allocated to the target communication terminal 2 in order, for example, as shown in FIG. 14, a pair of the first channel CH1 and second channel CH2, a pair of the second channel CH2 and third channel CH3, a pair of the third channel CH3 and fourth channel CH4, and a pair of the fourth channel CH4 and fifth channel CH5 may be allocated to the target communication terminal 2 in this order.

When three of the first channel CH1 to the fifth channel CH5 are allocated to the target communication terminal 2 in order, for example, as shown in FIG. 15, a pair of the first channel CH1 to third channel CH3, a pair of the second channel CH2 to fourth channel CH4, and a pair of the third channel CH3 to fifth channel CH5 may be allocated to the target communication terminal 2 in this order.

When four of the first channel CH1 to the fifth channel CH5 are allocated to the target communication terminal 2 in order, for example, as shown in FIG. 16, a pair of the first channel CH1 to fourth channel CH4 and a pair of the second channel CH2 to fifth channel CH5 may be alternately allocated to the target communication terminal 2.

When a channel CH is allocated to the target communication terminal 2 for uplink communication, an uplink unit resource 210 including any uplink slot SL of the first uplink slot SL1 to the fourth uplink slot SL4 may be allocated to the target communication terminal 2 as long as it is an uplink unit resource 210 including this channel CH.

Parts of a plurality of channels CH are allocated to the target communication terminal 2 for uplink communication in order, so that the period in which each channel CH is not allocated to the target communication terminal 2 for uplink communication can be prevented from becoming longer. That is, parts of a plurality of unit frequency bands are allocated to the target communication terminal 2 for uplink communication in order, which enables to prevent the period in which each unit frequency band is not allocated to the target communication terminal 2 for uplink communication from becoming longer. This enables the base station 1 to control the transmission directivity of the array antenna 110 based on the known signal received from the target communication terminal 2 at a timing close to the timing of performing downlink communication. Accordingly, the transmission performance of the base station 1 can be improved. Further, compared with the embodiment described above, the process of allocating uplink radio resources to the target communication terminal 2 is more simplified in this modification.

Among a plurality of channels, a channel CH not to be used in downlink communication with the target communication terminal 2 may be removed from the plurality of channels CH, and then, parts of the plurality of channels CH may be allocated to the target communication terminal 2 for uplink communication in order. In this case, unnecessary transmission of a known signal from the target communication terminal 2 can be prevented, and the channels CH for uplink communication can be used effectively.

<Other Modifications>

The frame configuration of the communication frame 200 to be used between the base station 1 and the communication terminal 2 is similar to the frame configuration of the XGP, which may be other frame configuration. Further, the present invention is also applicable to a base station of a communication system such as LTE.

While the invention has been described in detail, the foregoing description is in all aspects illustrative and not restrictive. It will be appreciated that numerous modifications unillustrated herein can be made without departing from the scope of the present invention.

DESCRIPTION OF THE REFERENCE NUMERALS 1 base station
2 communication terminal
13 communication unit
110a antenna
122 radio resource allocation unit

The invention claimed is:

1. A base station that communicates with a communication terminal using a plurality of antennas, the base station comprising:
   a communication unit including a plurality of antennas, for controlling, in transmitting a signal using the plurality of antennas, the transmission directivity of the plurality of antennas based on a known signal from the communication terminal; and
   a radio resource allocation unit for allocating, to the communication terminal, an uplink frequency band for use in transmission of the known signal from a plurality of unit frequency bands lined in a frequency direction,
   wherein the radio resource allocation unit determines the unit frequency band to be used as the uplink frequency band by the communication terminal in a communication frame based on an elapsed time since the time when the unit frequency band was used as the uplink frequency band for the last time before being used in the communication frame.

2. The base station according to claim 1, wherein in newly allocating the uplink frequency band to the communication terminal, the radio resource allocation unit does not allocate, to the communication terminal, a unit frequency band that is not to be allocated to the communication terminal as a downlink frequency band for use in the transmission to the communication terminal from the plurality of unit frequency bands.

3. The base station according to claim 1, wherein determining the unit frequency band to be used as the uplink frequency band by the communication terminal in a communication frame based on an elapsed time since the time when the unit frequency band was used as the uplink frequency band for the last time before being used in the communication frame comprises:
   for each of the plurality of unit frequency bands available to be allocated to the communication terminal as a downlink frequency band, determining an elapsed time since a prior allocation of that unit frequency band as the uplink frequency band in a preceding communication frame; and
   selecting one of the plurality of unit frequency bands with the highest determined elapsed time as the uplink frequency band in the communication frame.

4. The base station according to claim 3, wherein the radio resource allocation unit further allocates, to the communication terminal a downlink frequency band, for use in transmission to the communication terminal, from the plurality of unit frequency bands, and wherein in newly allocating the downlink frequency band to the communication terminal for a communication frame, the radio resource allocation unit newly determines the unit frequency band to be used as the downlink frequency band in the communication frame by:
   for each of the plurality of unit frequency bands available to be allocated to the communication terminal as the downlink frequency band, determining an elapsed time since a prior allocation of that unit frequency band as an uplink frequency band; and
   selecting one of the plurality of unit frequency bands with the shortest determined elapsed time as the downlink frequency band in the communication frame.

5. A base station that communicates with a communication terminal using a plurality of antennas, the base station comprising:
   a communication unit including a plurality of antennas, for controlling, in transmitting a signal using the plurality of antennas, the transmission directivity of the plurality of antennas based on a known signal from the communication terminal; and
   a radio resource allocation unit for allocating, to the communication terminal, for each of a plurality of communication frames, an uplink frequency band for use in transmission of the known signal from a plurality of unit frequency bands lined in a frequency direction,
   wherein, for each of the plurality of communication frames, the radio resource allocation unit allocates, to the communication terminal, parts of the plurality of unit frequency bands as the uplink frequency band according to a recurring order of unit frequency bands.

6. The base station according to claim 5, wherein in newly allocating the uplink frequency band to the communication terminal, the radio resource allocation unit does not allocate, to the communication terminal, a unit frequency band that is not to be allocated to the communication terminal as a downlink frequency band for use in the transmission to the communication terminal from the plurality of unit frequency bands.

7. A method of allocating a frequency band to a communication terminal by a base station that controls, in transmitting a signal to a communication terminal using a plurality of antennas, the transmission directivity of the plurality of antennas based on a known signal from the communication terminal, the method comprising:
   allocating, to a communication terminal, a downlink frequency band for use in transmission to the communication terminal; and
   allocating, to the communication terminal, an uplink frequency band for use in transmission of the known signal from a plurality of unit frequency bands lined in a frequency direction,
   wherein the unit frequency band to be used as the uplink frequency band by the communication terminal in a communication frame is determined based on an elapsed time since the time when the unit frequency band was used as the uplink frequency band for the last time before being used in the communication frame.

8. A method of allocating a frequency band to a communication terminal by a base station that controls, in transmitting a signal to a communication terminal using a plurality of antennas, the transmission directivity of the plurality of antennas based on a known signal from the communication terminal, the method comprising, for each of a plurality of communication frames:
   allocating, to a communication terminal, a downlink frequency band for use in transmission to the communication terminal; and
   allocating, to the communication terminal, an uplink frequency band for use in transmission of the known signal from a plurality of unit frequency bands lined in a frequency direction,
   wherein parts of the plurality of unit frequency bands are allocated to the communication terminal as the uplink frequency band according to a recurring order of unit frequency bands.

* * * * *